US012802043B2

(12) United States Patent
Choi

(10) Patent No.: US 12,802,043 B2
(45) Date of Patent: Nov. 17, 2026

(54) SYSTEM AND METHOD OF PROVIDING TO-DO LIST OF USER

(71) Applicant: Samsung Electronics Co., Ltd., Suwon-si (KR)

(72) Inventor: Hyung-tak Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 18/970,116

(22) Filed: Dec. 5, 2024

(65) Prior Publication Data

US 2025/0094934 A1 Mar. 20, 2025

Related U.S. Application Data

(63) Continuation of application No. 18/474,717, filed on Sep. 26, 2023, now Pat. No. 12,165,110, which is a continuation of application No. 17/512,066, filed on Oct. 27, 2021, now Pat. No. 11,803,819, which is a continuation of application No. 16/793,609, filed on
(Continued)

(30) Foreign Application Priority Data

Nov. 27, 2014 (KR) ........................ 10-2014-0167811

(51) Int. Cl.
*G06Q 10/109* (2023.01)

(52) U.S. Cl.
CPC ....... *G06Q 10/1097* (2013.01); *G06Q 10/109* (2013.01)

(58) Field of Classification Search
None
See application file for complete search history.

(56) References Cited

U.S. PATENT DOCUMENTS 5,573,404 A 11/1996 Stawski, II
6,092,197 A 7/2000 Coueignoux
(Continued)

FOREIGN PATENT DOCUMENTS

CN 101345956 A 1/2009
CN 101969496 A 2/2011
(Continued)

OTHER PUBLICATIONS

Karlson, Amy K., et al. "Mobile taskflow in context: a screenshot study of smartphone usage." Proceedings of the SIGCHI Conference on Human Factors in Computing Systems. 2010. (Year: 2010).*
(Continued)

*Primary Examiner* — Thomas L Mansfield
(74) *Attorney, Agent, or Firm* — Jefferson IP Law, LLP

(57) ABSTRACT

A device and a method of providing a to-do list of a user are provided. The device includes a controller configured to collect behavior information about behavior between the user and another user, the behavior being performed by using the device, generate a to-do list of the user based on the collected behavior information, and determine an unperformed task not performed by the user from among at least one task in the to-do list by using log information about an operation of the device, and an output unit configured to output notification information in a dialogue style, along with a notification reason for notifying the determined unperformed task.

12 Claims, 27 Drawing Sheets

Related U.S. Application Data

Feb. 18, 2020, now Pat. No. 11,164,160, which is a continuation of application No. 14/940,676, filed on Nov. 13, 2015, now Pat. No. 10,657,501.

(56) References Cited

U.S. PATENT DOCUMENTS

| | | | | |
|---|---|---|---|---|
| 6,405,170 | B1 | 6/2002 | Phillips et al. | |
| 6,842,877 | B2 * | 1/2005 | Robarts | G06F 21/6245 715/740 |
| 7,107,539 | B2 * | 9/2006 | Abbott | G06F 1/163 715/740 |
| 7,564,805 | B1 | 7/2009 | Cortez et al. | |
| 7,650,169 | B2 | 1/2010 | Seo et al. | |
| 7,797,204 | B2 | 9/2010 | Balent | |
| 7,844,454 | B2 | 11/2010 | Coles et al. | |
| 8,375,320 | B2 | 2/2013 | Kotler et al. | |
| 8,527,315 | B2 | 9/2013 | Shimoi et al. | |
| 8,589,407 | B2 | 11/2013 | Bhatia | |
| 8,595,785 | B2 | 11/2013 | Ku et al. | |
| 8,612,379 | B2 | 12/2013 | Chan et al. | |
| 9,106,757 | B2 | 8/2015 | Kim et al. | |
| 2004/0247748 | A1 | 12/2004 | Bronkema | |
| 2005/0124388 | A1 | 6/2005 | Seo et al. | |
| 2005/0131747 | A1 | 6/2005 | Vigil | |
| 2005/0192992 | A1 | 9/2005 | Reed et al. | |
| 2006/0282305 | A1 | 12/2006 | Gibson | |
| 2007/0239520 | A1 | 10/2007 | Collins | |
| 2007/0300225 | A1 * | 12/2007 | Macbeth | G06Q 10/10 718/100 |
| 2008/0049908 | A1 | 2/2008 | Doulton | |
| 2009/0018865 | A1 | 1/2009 | Earnest | |
| 2010/0268571 | A1 | 10/2010 | Davies et al. | |
| 2010/0332404 | A1 | 12/2010 | Valin | |
| 2011/0218960 | A1 | 9/2011 | Hatami-Hanza | |
| 2011/0223570 | A1 | 9/2011 | Bellontine | |
| 2011/0314418 | A1 | 12/2011 | Kotler et al. | |
| 2012/0290428 | A1 | 11/2012 | Ben-Bassat et al. | |
| 2013/0036117 | A1 | 2/2013 | Fisher et al. | |
| 2013/0073473 | A1 | 3/2013 | Heath | |
| 2014/0176603 | A1 | 6/2014 | Kumar et al. | |
| 2014/0200944 | A1 * | 7/2014 | Henriksen | G06Q 10/1093 705/7.19 |
| 2014/0294167 | A1 | 10/2014 | Kim et al. | |
| 2014/0297348 | A1 | 10/2014 | Ellis | |
| 2014/0310595 | A1 | 10/2014 | Acharya et al. | |
| 2015/0006222 | A1 * | 1/2015 | Isherwood | G06Q 10/1097 705/7.21 |
| 2015/0073790 | A1 | 3/2015 | Steuble et al. | |
| 2015/0121216 | A1 | 4/2015 | Brown et al. | |
| 2015/0148621 | A1 | 5/2015 | Sier | |
| 2016/0048934 | A1 | 2/2016 | Gross | |
| 2016/0094509 | A1 | 3/2016 | Ye | |
| 2016/0330869 | A1 | 11/2016 | Williams et al. | |

FOREIGN PATENT DOCUMENTS

| | | | | |
|---|---|---|---|---|
| CN | 102947787 | A | 2/2013 | |
| CN | 103686593 | A | 3/2014 | |
| CN | 108874895 | A | 11/2018 | |
| EP | 1542439 | B1 * | 3/2010 | H04M 1/72451 |
| JP | 2009-237667 | A | 10/2009 | |
| KR | 10-2008-0068793 | A2 | 7/2008 | |
| KR | 10-2008-0109322 | A | 12/2008 | |
| KR | 10-2009-0042601 | A | 4/2009 | |
| KR | 20120094449 | A * | 8/2012 | G06Q 10/1093 |
| KR | 10-1340464 | B1 | 12/2013 | |
| KR | 10-2014-0058861 | A | 5/2014 | |
| WO | 2013054296 | A2 | 4/2013 | |
| WO | 2013-173511 | A2 | 11/2013 | |
| WO | 2014071367 | A2 | 5/2014 | |
| WO | 2014/130696 | A2 | 8/2014 | |
| WO | 2015/187584 | A1 | 12/2015 | |

OTHER PUBLICATIONS

Siewiorek, Daniel P., et al. "SenSay: A Context-Aware Mobile Phone." ISWC. vol. 3. 2003. (Year: 2003).*

Refanidis, Ioannis, and Anastasios Alexiadis. "Deployment and Evaluation of Selfplanner, an Automated Individual Task Management System." Computational Intelligence 27.1 (2011). (Year: 2011).*

T. Hansen et al:"RFC 3798, Message Disposition Notification", pp. 1-31, XP055589352, May 31, 2004.

European Summons to oral proceedings dated Jun. 25, 2019, issued in European Patent Application No. 15863291.9.

Chinese Office Action dated Mar. 16, 2020, issued in Chinese Patent Application No. 201510850072.X.

European Decision to Refuse dated Feb. 16, 2021, issued in European Patent Application No. 15 863 291.9.

Extended European Search Report dated Jun. 21, 2021, issued in European Patent Application No. 21170164.4.

Mehl, M.R., Pennebaker, J.W., Crow, D.M. et al. The Electronically Activated Recorder (EAR): A device for sampling naturalistic daily activities and conversations. Behavior Research Methods, Instruments, & Computers 33, 517-523 (2001) (Year: 2001).

European Office Action dated Jun. 15, 2022, issued in European Patent Application No. 21 170 164.4.

European office Action dated Feb. 16, 2023, issued in European Application No. 21 170 164.4.

Goldstone, Robert L. et al., Collective behavior, Topics in cognitive science 1.3 (2009): 412-438. (Year: 2009).

Pardo, Jennifer S., On phonetic convergence during conversational interaction, The Journal of the Acoustical Society of America 119.4 (2006): 2382-2393. (Year: 2006).

Langan-Fox, Janice et al., Effects of advance organizers, mental models and abilities on task and recall performance using a mobile phone network, Applied Cognitive Psychology: Official Journal of the Society for Applied Research in Memory and Cognition 20.9 (2006): 1143-1165 (Year: 2006).

European Office Action dated Jan. 2, 2025, issued in European Application No. 21 170 164.4-1218.

* cited by examiner

FIG. 10

100 102 104

| MAIN TASK | SUB TASK | ADDITIONAL INFORMATION |
|---|---|---|
| PREPARE TRIP TO JEJU ISLAND | BOOK FLIGHT TICKETS FOR JEJU ISLAND (MAY 5, MAY 9) | AIRFARE COMPARING INFORMATION |
| | SEARCH FOR TOURIST ATTRACTION | RECOMMENDED TOURIST ATTRACTION INFORMATION |
| | REND CAR (MAY 5, MAY 9) | RENTAL FEE COMPARING INFORMATION |
| | BUY TRAVEL GOODS | PRICE COMPARING INFORMATION |
| SEND PHOTO OF GIRLS GENERATION TO USER C | SEARCH FOR LOCATION OF FAN CLUB EVENT OF GIRLS GENERATION | TRAFFIC INFORMATION |
| | TAKE PHOTO OF GIRLS GENERATION | |
| | TRANSMIT PHOTO OF GIRLS GENERATION TO USER C | |
| ATTEND SEOUL XX EXHIBITION ON APRIL 30 | ASSIGN COLLEAGUE TO ATTEND | RELATED PERSON ANALYSIS INFORMATION |
| | TRANSMIT MESSAGE | |
| | BOOK TICKET | BOOKING RELATED ANALYSIS INFORMATION |
| | LIST OF EXHIBITS | |
| BUY PRODUCT A | DETERMINE PRODUCT | PRICE COMPARING INFORMATION |
| | PAY FOR PRODUCT | PAYMENT RECOMMENDATION INFORMATION |

FIG. 12A
1000
1. PREPARE FOR TRIP TO JEJU ISLAND
1-1. BOOK FLIGHT TICKETS FOR JEJU ISLAND
1-2. SEARCH FOR TOURIST ATTRACTION
1-3. RENT CAR
1-4. BUY TRAVEL GOODS

FIG. 12C
1000
80% 08:01 AM
1. PREPARE FOR TRIP TO JEJU ISLAND
1-1. SEARCH FOR TOURIST ATTRACTION
1-2. RENT CAR
1-3. BUY TRAVEL GOODS

FIG. 16

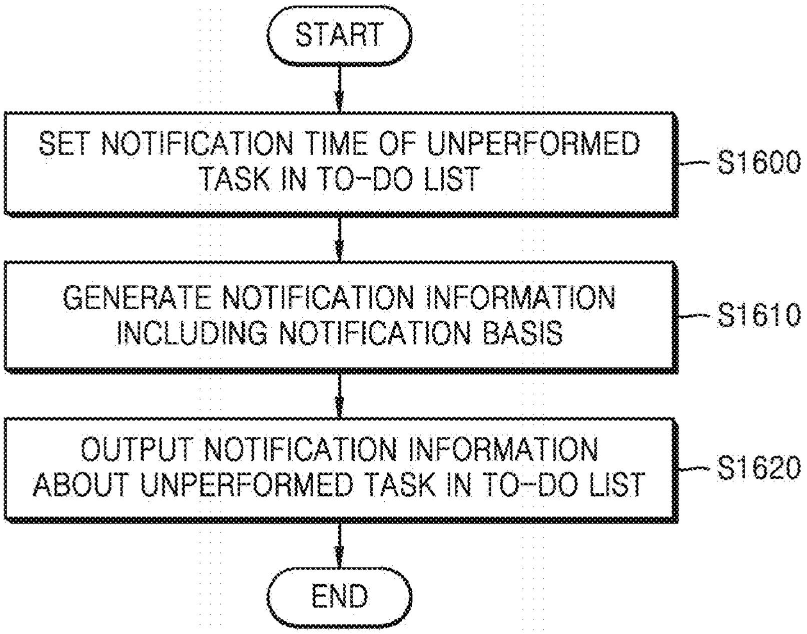

FIG. 17

170 172

| TASK | NOTIFICATION TIME |
|---|---|
| BOOK FLIGHT TICKETS FOR JEJU ISLAND (MAY 5/MAY 9) | MAY 3, 2014 15:00 |
| | WHEN INTERNET BROWSER IS USED |
| SEARCH FOR TOURIST ATTRACTION | DAILY |
| | WHEN INTERNET BROWSER IS USED |
| TAKE PHOTO OF GIRLS GENERATION | MAY 4, 2014 16:00 |
| | WHEN LOCATION INFORMATION ABOUT EVENT VENUE IS CONFIRMED |
| SEND PHOTO OF GIRLS GENERATION TO USER C | EVERY FIVE HOURS FROM MAY 5 |
| | WHEN MESSENGER APPLICATION IS EXECUTED |

SYSTEM AND METHOD OF PROVIDING TO-DO LIST OF USER

CROSS-REFERENCE TO RELATED APPLICATION(S)

This application is a continuation application of prior application Ser. No. 18/474,717, filed on Sep. 26, 2023, which application is a continuation application of prior application Ser. No. 17/512,066, filed on Oct. 27, 2021, which has issued as U.S. Pat. No. 11,803,819 on Oct. 31, 2023, which application is a continuation application of prior application Ser. No. 16/793,609, filed on Feb. 18, 2020, which has issued a U.S. Pat. No. 11,164,160 on Nov. 2, 2021, which application is a continuation application of prior application Ser. No. 14/940,676, filed on Nov. 13, 2015, which has issued as U.S. Pat. No. 10,657,501 on May 19, 2020, and is based on and claims priority under 35 U.S.C. § 119 (a) of a Korean patent application number 10-2014-0167811, filed on Nov. 27, 2014 in the Korean Intellectual Property Office, the entire disclosure of which is hereby incorporated by reference.

TECHNICAL FIELD

The present disclosure relates to systems and methods of providing a to-do list of a user. More particularly, the present disclosure relates to a system and method of generating a to-do list of a user based on the behavior of the user and notifying the user of an unperformed task in the to-do list.

BACKGROUND

According to the development of multimedia and network technologies, a user is able to use a desired service through various devices and service providing servers. In addition, the user may communicate with another user by using their respective devices. The behavior patterns of the user become complex as the user uses the various devices and the service providing servers, but it is difficult for the user to effectively determine his/her obligations since the obligations are related to the various devices, other user, and service providing server. Accordingly, a technology of effectively generating a to-do list of a user by analyzing the behavior of the user and efficiently determining and notifying the user of an unperformed task from among tasks in the to-do list is required.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide systems and methods of providing a to-do list of a user, whereby an unperformed task in the to-do list of the user may be effectively determined based on operations of a device of the user and a service providing server to which the user is registered. The user being registered to the service providing server may indicate that the user is registered to a service provided by the service providing server.

Another aspect of the present disclosure is to provide systems and methods of providing a to-do list of a user, whereby whether a task in the to-do list is performed based on the behavior of another user related to the task in the to-do list may be determined.

Another aspect of the present disclosure is to provide systems and methods of providing a to-do list of a user, whereby an unperformed task in the to-do list may be determined based on detailed operations of a device for determining whether a task in the to-do list is performed and relations between the detailed operations.

Another aspect of the present disclosure is to provide systems and methods of providing a to-do list of a user, whereby a user is notified about a reason for notifying an unperformed task and the unperformed task.

In accordance with an aspect of the present disclosure, a device for providing a to-do list of a user is provided. The device includes a controller configured to collect behavior information about behavior between the user and another user, the behavior being performed by using the device, generate a to-do list of the user based on the collected behavior information, and determine an unperformed task not performed by the user from among at least one task in the to-do list by using log information about an operation of the device, and an output unit configured to output notification information in a dialogue style, along with a notification reason for notifying the determined unperformed task.

The controller may be further configured to determine detailed operations of the device for performing the at least one task in the to-do list and relations between the detailed operations and determine the unperformed task based on the relations between the detailed operations and whether the detailed operations are performed.

The controller may be further configured to determine the detailed operations and the relations between the detailed operations by determining the other user and content related to the at least one task in the to-do list, determine an application related to the at least one task in the to-do list, the application being installed in the device, and functions of the application, and combine the application, the functions, the other user, and some or all of the content to define the detailed operation of the device for performing the at least one task.

The controller may be further configured to determine the unperformed task by using log information about an operation of another device of the other user related to the at least one task in the to-do list.

The controller may be further configured to determine the unperformed task by using log information about an operation of another device of the user and log information about an operation of a service providing server to which the user is registered.

The controller may be further configured to collect at least one of a telephone conversation between the user and the other user, messages exchanged between the user and the other user, schedule information of the user, memo information of the user, and log information of an application executed in the device.

The controller may be further configured to generate the to-do list comprising at least one main task and at least one sub task subordinate to the at least one main task.

The controller may be further configured to generate the to-do list by converting a telephone conversation between the user and the other user to text, and analyzing tone information of the telephone conversation and the text.

The at least one main task may be determined based on the behavior information of the user, and the at least one sub task is selected from among pre-set sub tasks corresponding to the at least one main task.

The controller may be further configured to update the to-do list as some or all of the at least one sub task in the to-do list are performed.

The notification information may include a reason for providing a notification about the unperformed task.

The controller may be further configured to set a time when the unperformed task is determined and a time when the notification information is output.

In accordance with another aspect of the present disclosure, a method of providing, by a first device, a to-do list of a user is provided. The method includes collecting behavior information about behavior between the user and another user, the behavior being performed by using the first device, generating a to-do list of the user based on the collected behavior information, determining an unperformed task not performed by the user from among at least one task in the to-do list by using log information about an operation of the first device, and outputting notification information in a dialogue style along with a notification reason for notifying the determined unperformed task.

The determining of the unperformed task may include determining detailed operations of the first device for performing the at least one task in the to-do list and relations between the detailed operations, and determining the unperformed task based on the relations between the detailed operations and whether the detailed operations are performed.

The determining of the detailed operations and the relations between the detailed operations may include determining the other user and content related to the at least one task in the to-do list, determining an application related to the at least one task in the to-do list, the application being installed in the first device, and functions of the application, and combining the application, the functions, the other user, and some or all of the content to define the detailed operation of the first device for performing the at least one task.

The generating of the to-do list may include generating the to-do list including at least one main task and at least one sub task subordinate to the at least one main task.

The notification information may include a reason for providing a notification about the unperformed task.

In accordance with another aspect of the present disclosure, a server for providing a to-do list of a user is provided. The server includes a communication unit configured to receive behavior information of the user from at least one device of the user, and a controller configured to generate a to-do list of the user based on the received behavior information, determine an unperformed task not performed by the user from among at least one task in the to-do list by using log information about an operation of the at least one device, and provide notification information in a dialogue style through the communication unit to the at least one device, wherein the notification information comprises a list of the unperformed task and a reason for notifying the unperformed task.

In accordance with another aspect of the present disclosure, a method of providing, by a server, a to-do list of a user is provided. The method includes receiving behavior information of the user from at least one device of the user, generating a to-do list of the user based on the received behavior information, determining an unperformed task not performed by the user from among at least one task in the to-do list by using log information about an operation of the at least one device and log information about an operation of a service providing server that the user is registered to, and providing notification information in a dialogue style to the at least one device, wherein the notification information comprises a list of the unperformed task and a reason for notifying the unperformed task.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will become more apparent from the following description taken in conjunction with the accompanying drawings, in which:

FIG. 10 illustrates a table of a to-do list generated by a device according to an embodiment of the present disclosure;

FIG. 16 is a flowchart of a method of outputting, by a device, notification information indicating an unperformed task according to an embodiment of the present disclosure;

FIG. 17 illustrates a notification time table indicating a notification time of notification information according to an embodiment of the present disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In various embodiments of the present disclosure, when a region is "connected" to another region, the regions may not only be "directly connected", but may also be "electrically connected" via another device therebetween. In addition, when a region "includes" an element, the region may further include another element instead of excluding the other element, otherwise differently stated.

As used herein, the term "and/or" includes any and all combinations of one or more of the associated listed items. Expressions, such as "at least one of", when preceding a list of elements, modify the entire list of elements and do not modify the individual elements of the list.

Hereinafter, various embodiments of the present disclosure will be described with reference to accompanying drawings.

Figure 1:
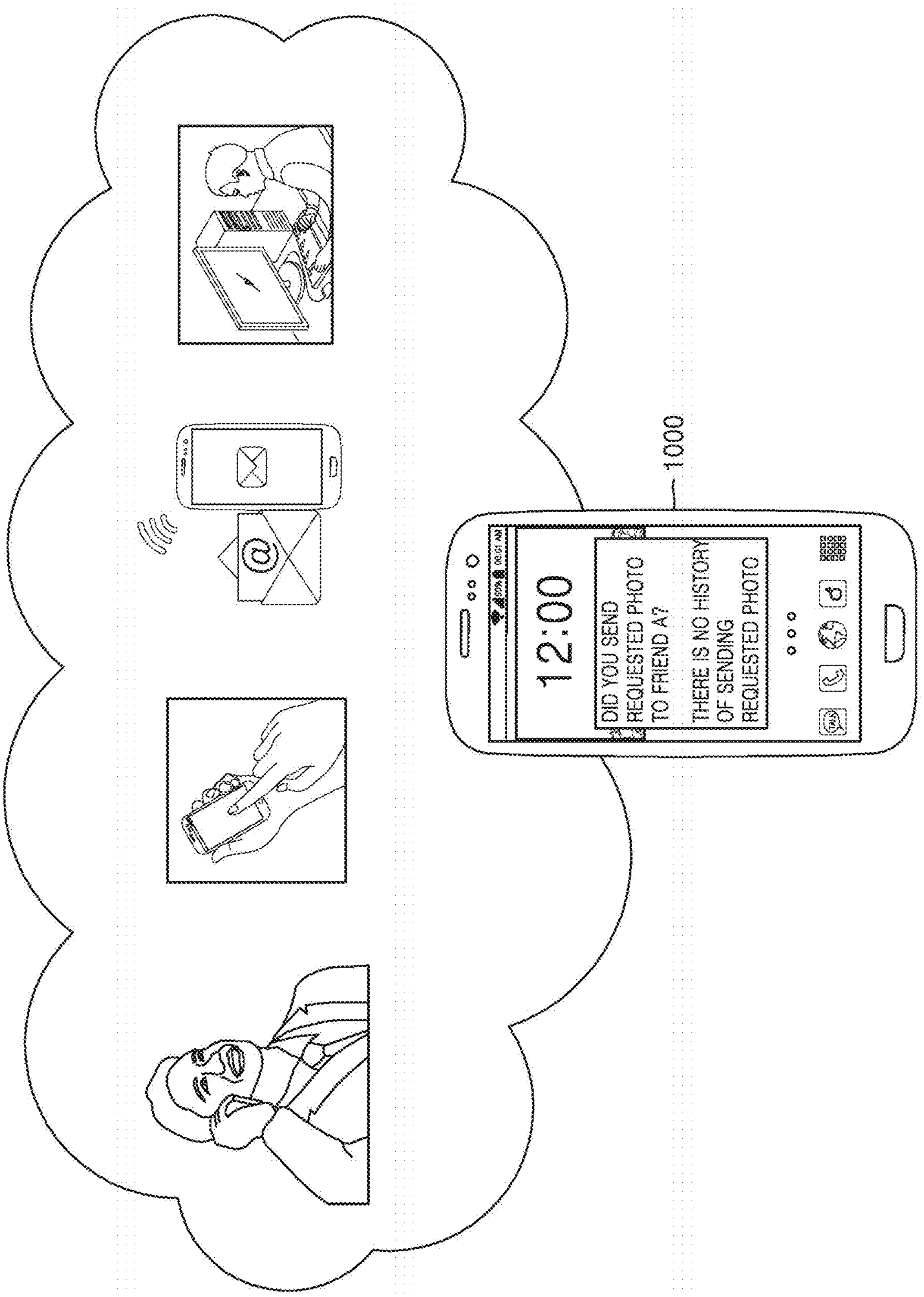
FIG. 1 is a diagram illustrating a device notifying a user of an obligation according to an embodiment of the present disclosure.

FIG. 1 is a diagram illustrating a device notifying a user of an obligation according to an embodiment of the present disclosure.

Referring to FIG. 1, a device 1000 may analyze behavior of the user to determine an obligation to be performed by the user, and when it is determined that the obligation is not performed by the user, the device 1000 may notify the user that the obligation is not performed. For example, the device 1000 may analyze the behavior of the user using the device 1000, such as a phone call, message transmission, and email transmission, and generate a to-do list. In addition, the device 1000 may monitor the behavior of the user to determine whether the obligation is performed and notify the user when it is determined that the obligation is not performed. In addition, the device 1000 may output a reason for notifying the obligation and provide additional information related to the obligation.

Examples of the device 1000 include a smart phone, a tablet personal computer (PC), a PC, a smart television (TV), a mobile phone, a personal digital assistant (PDA), a laptop, a media player, a micro-server, a global positioning system (GPS) device, an electronic book terminal, a digital broadcasting terminal, a navigation, a kiosk, a moving picture experts group phase 1 or phase 2 (MPEG-1 or MPEG-2) audio layer 3 (MP3) player, a digital camera, and other mobile or non-mobile computing devices, but are not limited thereto. Alternatively, the device 1000 may be a wearable device, such as a watch, glasses, a hair band, a ring, and the like, which has a communication function and a data processing function.

Figure 2:
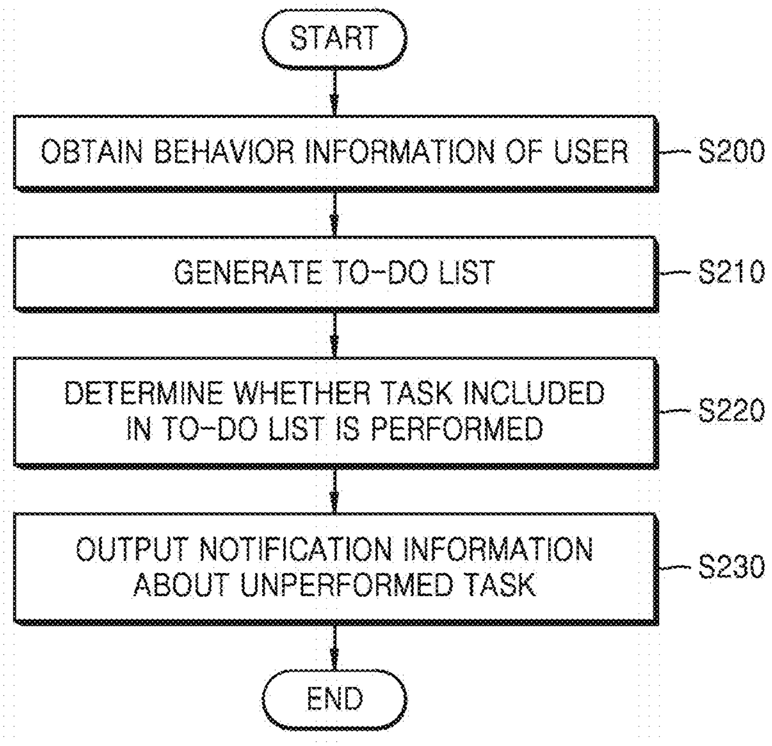
FIG. 2 is a flowchart of a method of notifying, by a device, a user of a to-do list according to an embodiment of the present disclosure.

FIG. 2 is a flowchart of a method of notifying, by a device, a user of a to-do list according to an embodiment of the present disclosure.

Referring to FIG. 2, in operation S200, the device 1000 may obtain behavior information of the user. The behavior information of the user may be information about behavior of the user using the device 1000 and may be used to determine an obligation of the user. For example, the device 1000 may obtain information about a telephone conversion through the device 1000, contents of messages (for example, short message services (SMSs), multimedia messaging services (MMSs), chat messages, and the like) exchanged through the device 1000, contents of emails exchanged through the device 1000, contents of memos recorded in the device 1000, contents of voice memos recorded in the device 1000, and contents of schedules stored in the device 1000.

In operation S210, the device 1000 may generate a to-do list of the user. The device 1000 may generate the to-do list by analyzing the behavior information of the user. The device 1000 may analyze contents of communication between the user and another user, and determine an obligation of the user based on the analyzed contents. For example, the device 1000 may analyze the contents of communication by using at least one of various data mining technologies. Alternatively, for example, the device 1000 may analyze the contents of communication by using at least one of various natural language interpreting technologies. In this case, the device 1000 may interpret the contents of communication through a natural language processing method, such as a morpheme analyzing method or a construction analyzing method.

In addition, the device 1000 may analyze the memos and the schedules stored in the device 1000 to determine an obligation of the user. The device 1000 may analyze the memos and the schedules by using at least one of various data mining technologies and natural language interpreting technologies.

In addition, the device 1000 may analyze operations of the device 1000 performed through an application installed in the device 1000 and determine an obligation of the user. In this case, the device 1000 may determine the obligation of the user by using log information about the application.

An obligation of the user may include a simple task or a complex task. The simple task may include one task, such as "transmit file" or "transmit email". The complex task may include a main task and a sub task. For example, the complex task may include "prepare for trip" as a main task and "book flight ticket", "search for tourist attraction", "rent car", "search for restaurant", "search for accommodation", and "buy travel goods" as sub tasks.

In addition, the device 1000 may display the to-do list on a screen of the device 1000, and provide, to the user, an editing tool for editing the to-do list. The device 1000 may revise the to-do list based on a user input through the editing tool.

In operation S220, the device 1000 may determine whether a task included in the to-do list is performed. The device 1000 may determine whether the task included in the to-do list is performed by using log information of the user stored in the device 1000, another device (not shown), and a service providing server 3000 of FIG. 21 that will be described later. In this case, a monitoring item related to performing of the task included in the to-do list may be pre-set. The monitoring item may be, for example, an item related to an application, the user, and an operation of the application or the user, which is related to performing of the task in the to-do list. In addition, the device 1000 may analyze the monitoring item by using the log information to determine whether the task in the to-do list is performed.

In addition, the device 1000 may determine whether the task included in the to-do list is performed by using log information of the other user stored in the other device and the service providing server 3000. In this case, the other user may be related to performing of the task included in the to-do list. For example, when the task included in the to-do list is "transmit, by user of device 1000, photo to other user", the device 1000 may monitor operations of the other device of the other user or the log information of the other user stored in the service providing server 3000 to which the other user is registered. The other user being registered to the service providing server 3000 may indicate that the other user is registered to a service provided by the service providing server 3000. Further, the service of the service providing server 3000 may include a service of providing at least one to-do list.

A time when the device 1000 determines whether the task included in the to-do list is performed may be pre-set.

In operation S230, the device 1000 may output notification information about an unperformed task from among tasks included in the to-do list. The device 1000 may pre-set a time when the notification information is output. For example, the device 1000 may output the notification information according to pre-set cycles. For example, the device 1000 may output the notification information when a pre-set event, such as execution of a certain application or a certain time being reached, is generated.

In addition, the device 1000 may generate basis information about a reason for outputting the notification information, and output the notification information including the basis information. In this case, the device 1000 may generate the basis information in a natural language.

Figure 3:
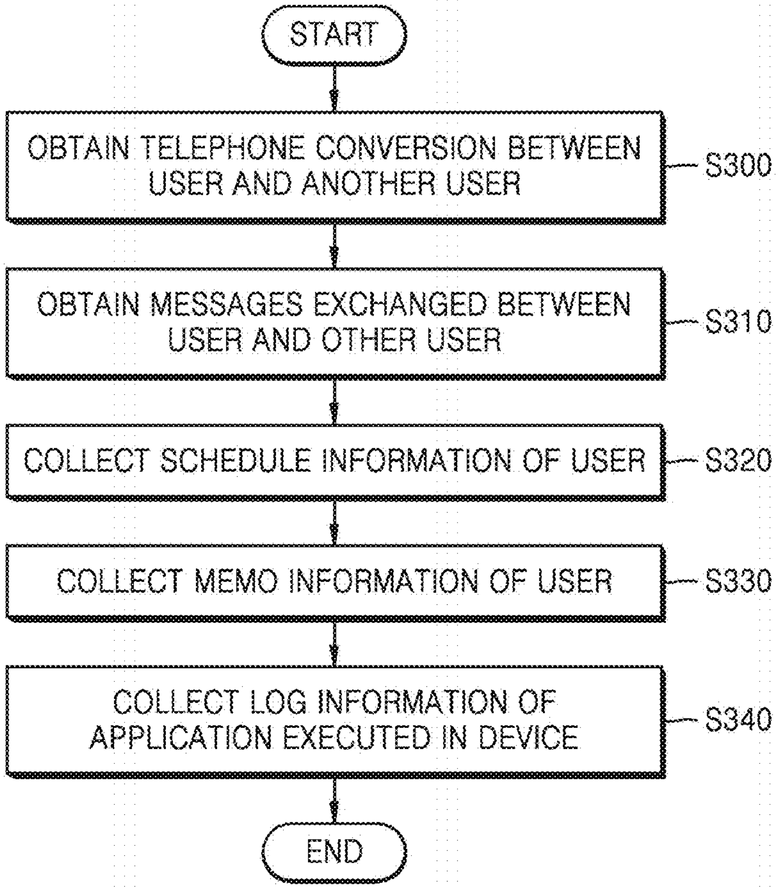
FIG. 3 is a flowchart of a method of obtaining, by a device, behavior information of a user according to an embodiment of the present disclosure.

FIG. 3 is a flowchart of a method of obtaining, by a device, behavior information of a user according to an embodiment of the present disclosure.

Referring to FIG. 3, in operation S300, the device 1000 may obtain telephone conversion between the user and another user. When a call application in the device 1000 is executed and a call is connected with the other user, the device 1000 may record the telephone conversion between the user and the other user. In addition, the device 1000 may convert the telephone conversion to text. The device 1000 may directly convert the telephone conversation to the text, but an embodiment of the present disclosure is not limited thereto. For example, the device 1000 may transmit the recorded telephone conversation to a server 2000, and receive the text obtained by converting the telephone conversation from the server 2000.

In operation S310, the device 1000 may obtain messages exchanged between the user and the other user. The device 1000 may obtain the messages as a message exchange application in the device 1000 is executed and the messages are exchanged between the user and the other user. Examples of the message exchange application include a chatting application, an SMS/MMS exchange application, a messenger application, and a social network service (SNS) application. In addition, the device 1000 may obtain text of emails exchanged by the device 1000. In this case, the device 1000 may obtain the text of the emails from a web browser or an email exchange application executed in the device 1000.

In operation S320, the device 1000 may collect schedule information of the user. The user of the device 1000 may input the schedule information to the device 1000 by using a schedule management application in the device 1000, and the device 1000 may collect the schedule information from the schedule management application. In addition, the user of the device 1000 may record the schedule information in the service providing server 3000 by using a service of the service providing server 3000, and the device 1000 may receive the schedule information stored in the service providing server 3000 from the service providing server 3000. In this case, the device 1000 may receive the schedule information from the service providing server 3000 by using user identification (ID) of the service providing server 3000. In addition, the user of the device 1000 may input the schedule information to another device (not shown) of the user, and the device 1000 may receive the schedule information from the other device.

In operation S330, the device 1000 may collect memo information of the user. The user of the device 1000 may input a memo to the device 1000 by using a memo application in the device 1000, and the device 1000 may collect the memo information from the memo application. In addition, the user of the device 1000 may record the memo in the service providing server 3000 by using a service of the service providing server 3000, and the device 1000 may receive the memo information stored in the service providing server 3000 from the service providing server 3000. In this case, the device 1000 may receive the memo information from the service providing server 3000 by using the user ID of the service providing server 3000. In addition, the user of the device 1000 may input the memo to the other device, and the device 1000 may receive the memo information from the other device.

In addition, the user may store a voice memo in the other device and the service providing server 3000, and the device 1000 may obtain text by converting the voice memo to text by using a speech to text (STT) converting technology.

In operation S340, the device 1000 may obtain log information of an application executed in the device 1000. The log information may indicate which operation is performed by the application executed in the device 1000 based on a user input. The device 1000 may collect the log information about detailed operations of the application executed in the device 1000, in addition to behavior information collected in operations S300 through S330, to use the log information and determine behavior patterns of the user related to an operation of the device 1000.

Figure 4:
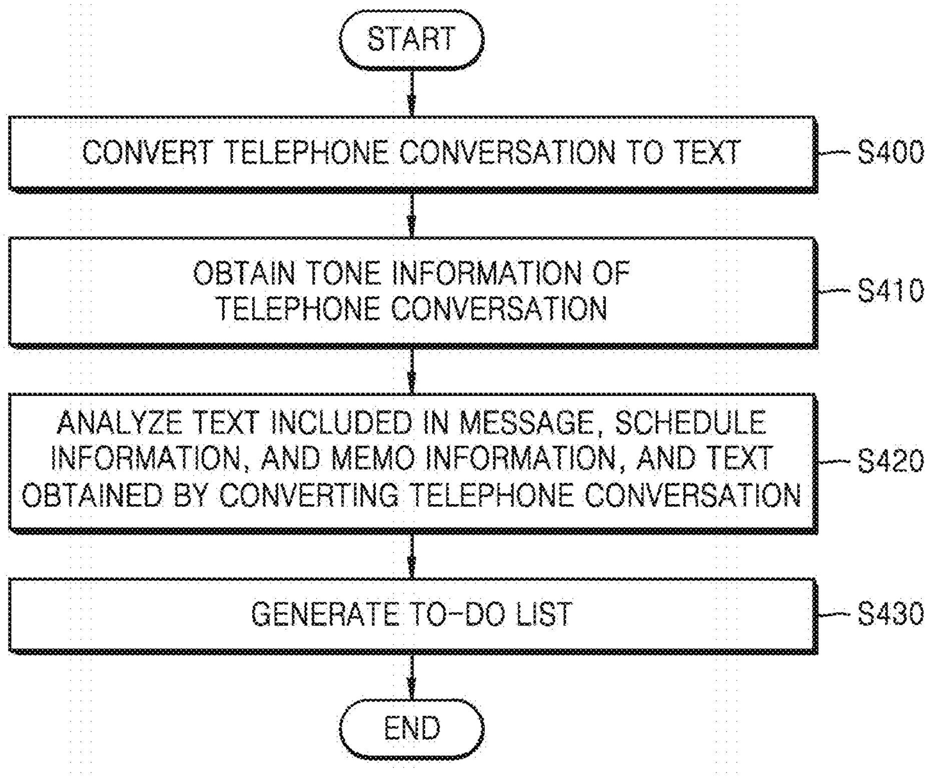
FIG. 4 is a flowchart of a method of generating, by a device, a to-do list by using a telephone conversation and tone information of the telephone conversation according to an embodiment of the present disclosure.

FIG. 4 is a flowchart of a method of generating, by a device, a to-do list by using a telephone conversation and tone information of the telephone conversation according to an embodiment of the present disclosure.

Referring to FIG. 4, in operation S400, the device 1000 may convert the telephone conversation to text. The device 1000 may automatically recognize the telephone conversation between a user and another user, and convert the telephone conversation to the text. Alternatively, the device 1000 may transmit the telephone conversation between the user and the other user to the server 2000, and receive the text obtained by converting, by the server 2000, the telephone conversation from the server 2000.

In operation S410, the device 1000 may obtain the tone information of the telephone conversation. For example, the device 1000 may obtain information about loudness and a frequency of the telephone conversation. The device 1000 may synchronize the tone information and the text obtained by converting the telephone conversation.

In operation S420, the device 1000 may analyze text included in a message, schedule information, and memo information, and the text obtained by converting the telephone conversation. The device 1000 may interpret a meaning of the text included in the message, the schedule information, and the memo information, and the text obtained by converting the telephone conversation, by using at least one of various data mining technologies and natural language processing technologies. In this case, the device 1000 may determine a context of the conversation between the user and the other user, and determine the meaning of the text based on the context. The device 1000 may determine the meaning of the text by using at least one data mining technology and/or at least one natural language processing technology. In addition, the device 1000 may determine keywords corresponding to interrogatives, such as "who", "when", "where", "what", "how", and "why", based on the meaning of the text, and combine the keywords to determine a task to be performed by the user.

In addition, the device 1000 may use the tone information synchronized with the text obtained by converting the telephone conversation to determine weights of words included in the text and determine the meaning of the text based on the weights.

In addition, the device 1000 may determine, based on the meaning of the text, a task the user requests the other user to do, a task the other user requests the user to do, and a task related to a question asked between the user and the other user.

In operation S430, the device 1000 may generate a to-do list of the user. The device 1000 may determine an authentic level of the task determined in operation S420, and when the authentic level of the task is equal to or higher than a pre-set threshold value, the task may be determined to be included in the to-do list. At this time, the device 1000 may determine the context of the conversation between the user and the other user, and determine the authentic level of the task based on the context.

In addition, the device 1000 may automatically determine sub tasks related to the task determined in operation S420. The device 1000 may determine a main task based on the meaning of the text, and determine sub tasks related to the main task. For example, the device 1000 may determine "prepare for trip to Jeju island for May 5" as the main task based on the text and "book flight ticket for May 5", "search for tourist attraction", "rent car", and "buy travel goods" as sub tasks for preparing for a trip. In this case, a list of sub tasks related to a main task may be pre-set, and the device 1000 may select some of the sub tasks in the list. The list may be set by using behavior patterns of the user. For example, information about transportation preferred by the user, a rental car company preferred by the user, and a trip theme preferred by the user may be used to determine a sub task.

In addition, the device 1000 may display, on the screen, a list of tasks to be included in the to-do list, and determine a task to be included in the to-do list based on a user input regarding the displayed list. In addition, the device 1000 may display, on the screen, a graphical user interface (GUI) for revising a task to be included in the to-do list, and revise the task to be included in the to-do list based on a user input through the GUI.

Figure 5:
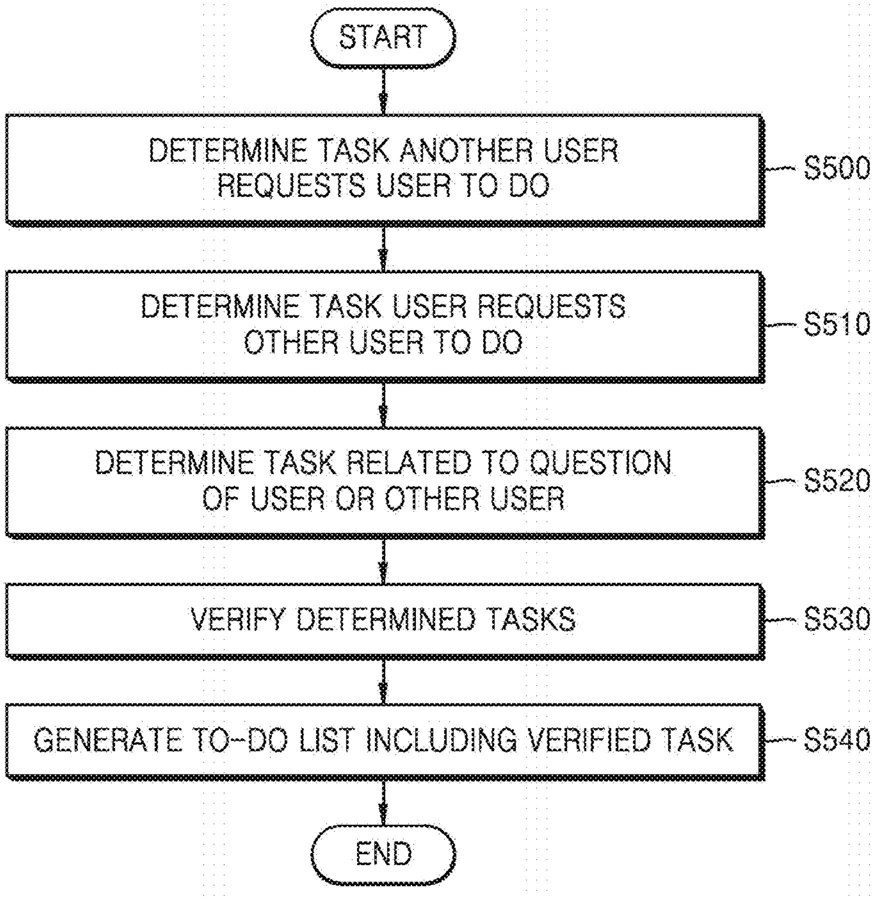
FIG. 5 is a flowchart of a method of generating, by a device, a to-do list by determining and verifying a task to be included in the to-do list according to an embodiment of the present disclosure.

FIG. 5 is a flowchart of a method of generating, by a device, a to-do list by determining and verifying a task to be included in the to-do list according to an embodiment of the present disclosure.

Referring to FIG. 5, in operation S500, the device 1000 may determine a task another user requests a user to do. The device may determine the task by identifying a message, an email, and telephone conversation transmitted from the other user to the user, and by analyzing the identified message, email, and telephone conversation. In addition, for example, the device 1000 may determine a meaning of text included in behavior information of the user or text obtained by converting the telephone conversation, by using a technology, such as intention extraction analytics, dialog act analytics, information extraction analytics, class detection, regular expression, and the like. In addition, the device 1000 may determine the task based on the meaning of the text.

In operation S510, the device 1000 may determine a task the user requests the other user to do. The device 1000 may determine the task the user requests the other user to do by identifying a message, an email, and telephone conversation transmitted from the user to the other user, and analyzing the identified message, email, and telephone conversation. In addition, for example, the device 1000 may determine meanings of text included in behavior information of the user or text obtained by converting the telephone conversation, by using a technology, such as intention extraction analytics, dialog act analytics, information extraction analytics, class detection, regular expression, and the like. In addition, the device 1000 may determine the task based on the meanings of the text.

In operation S520, the device 1000 may determine a task related to a question of the user or the other user. The device 1000 may determine the task related to the question of the user or the other user by identifying messages, emails, and telephone conversation exchanged between the user and the other user, and analyzing the identified messages, emails, and telephone conversation. In addition, for example, the device 1000 may determine meanings of text included in behavior information of the user or text obtained by converting the telephone conversation, by using a technology, such as intention extraction analytics, dialog act analytics, information extraction analytics, class detection, regular expression, and the like. In addition, the device 1000 may determine the task based on the meaning of the text.

In operation S530, the device 1000 may verify the determined tasks. The device 1000 may verify the determined tasks based on context of the text obtained from the messages, emails, and telephone conversation. For example, when a phrase of the other user requesting the user to transmit a photo and an answer that the user will transmit the photo to the other user are included in the text, the device 1000 may determine a task "will transmit photo to other user" to be included in a to-do list. Alternatively, the device 1000 may determine authentic levels of the determined tasks based on the context of the text and also determine a task having an authentic level equal to or higher than a pre-set threshold value to be included in the to-do list. For example, the device 1000 may determine how many words corresponding to interrogatives, such as "who", "when", "where", "what", "how", and "why", are included in the determined tasks. In addition, for example, the device 1000 may determine the authentic level of the determined task by extracting an overall conversation session from the text via dialogue boundary detection and analyzing the extracted session and the words corresponding to the interrogatives.

In addition, the device 1000 may verify the determined tasks based on a user input. The device 1000 may display, on the screen, the determined tasks, and determine whether the determined tasks are to be performed by the user based on a user input.

In addition, the device 1000 may automatically determine and verify sub tasks related to the verified task.

In operation S540, the device 1000 may generate a to-do list including the verified task. The device 1000 may generate the to-do list by listing the verified tasks. The device 1000 may display, on the screen, a GUI for revising the tasks included in the to-do list, and revise the tasks based on a user input through the GUI.

Figure 6:
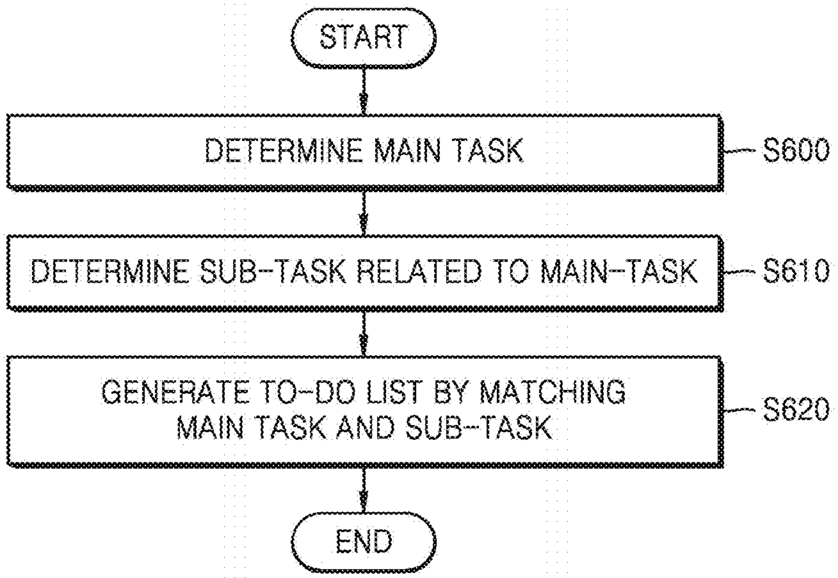
FIG. 6 is a flowchart of a method of determining, by a device, a main task and a sub task according to an embodiment of the present disclosure.

FIG. 6 is a flowchart of a method of determining, by a device, a main task and a sub task according to an embodiment of the present disclosure.

Referring to FIG. 6, in operation S600, the device 1000 may determine the main task to be included in a to-do list. The device 1000 may determine the main task to be included in the to-do list by analyzing text obtained from behavior information of a user. For example, the device 1000 may determine "prepare for trip to Jeju island for May 5" or "transmit photo to another user" as the main task.

In operation S610, the device 1000 may determine the sub task related to the main task. The device 1000 may determine the sub task related to the main task by determining a purpose and contents of the main task and selecting a sub task from a list of sub tasks pre-determined according to types and contents of main tasks. For example, the device 1000 may identify that the main task "prepare for trip to Jeju island for May 5" is a task for trip preparation based on text and select "book flight ticket", "search for tourist attraction", and "buy travel goods" from among pre-set tasks related to the trip preparation. In addition, the device 1000 may determine sub tasks, such as "book flight ticket to Jeju island for May 5", "book rental car to be used in Jeju island", "search for tourist attraction in Jeju island", and "buy travel goods", based on contents of the main task. At this time, the list of sub tasks may be determined by using behavior patterns of the user. For example, information about transportation preferred by the user, a rental car company preferred by the user, and a trip theme preferred by the user may be used to determine the sub task.

Meanwhile, the device 1000 may classify the sub tasks according to time. For example, the sub tasks related to the main task "prepare for trip" may be classified into sub tasks before a trip, during a trip, and after a trip. The device 1000 may determine, as sub tasks before a trip, "search for transportation", "search for accommodation", and "buy travel goods", determine, as sub tasks during a trip, "search for restaurant", "search for transportation", and "search for tourist attraction", and determine, as a sub task after a trip", "write report".

In addition, the device 1000 may determine a sub task of a sub task. For example, the device 1000 may determine as sub tasks of a sub task "search for transportation", "book flight ticket" and "book rental car". For example, the device 1000 may determine as sub tasks of a sub task "write report", "download materials", "determine report format", "progress report", and "final report".

Meanwhile, the device 1000 may verify the determined sub task. For example, the device 1000 may display, on the screen, the determined sub task, and verify the sub task based on a user input for verifying the sub task.

In operation S620, the device 1000 may generate a to-do list by matching the main task and the sub task. The device 1000 may generate the to-do list by combining at least one main task and at least one sub task matching the at least one main task.

In addition, when an order of performing tasks is determined, the device 1000 may dynamically change the to-do list based on whether some of the tasks are performed. As a sub task of a preceding stage is performed, the device 1000 may add further detailed sub tasks of subsequent stages to the to-do list. For example, when a sub task "before trip" is performed, the device 1000 may add detailed sub tasks "during trip" to the to-do list to the to-do list.

Figure 7:
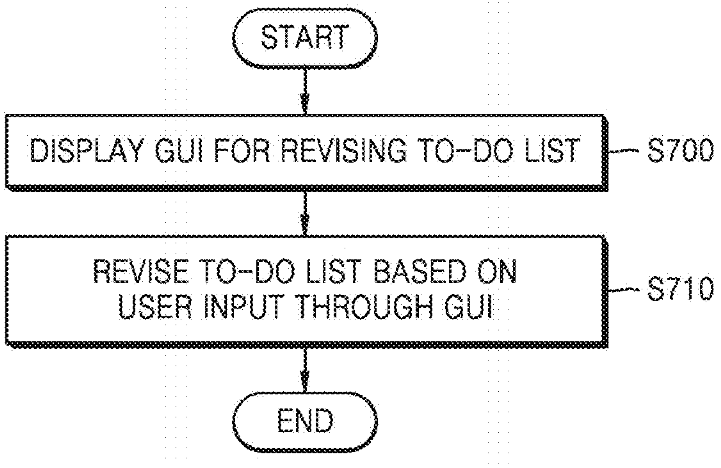
FIG. 7 is a flowchart of a method of revising, by a device, a to-do list based on a user input according to an embodiment of the present disclosure.

FIG. 7 is a flowchart of a method of revising, by a device, a to-do list based on a user input according to an embodiment of the present disclosure.

Referring to FIG. 7, in operation S700, the device 1000 may display, on the screen, a GUI for revising the to-do list. The GUI for revising the to-do list may include a region for displaying the to-do list, and may include an edit window for revising a task selected from tasks in the to-do list.

In operation S710, the device 1000 may revise the to-do list based on a user input through the GUI. For example, a user may select a main task "prepare trip to Jeju island" from the to-do list displayed through the GUI, and the device 1000 may display a character input window for editing "prepare trip to Jeju island" as "prepare trip to Jeju island" is selected. In addition, the user may revise "prepare trip to Jeju island" to "prepare trip to Jeju island for May 5" by using the character input window.

In addition, as the main task in the to-do list is revised, the device 1000 may automatically revise sub tasks related to the revised main task. At this time, the device 1000 may interpret a meaning of the revised main task, and revise the sub tasks based on the interpreted meaning. In addition, the device 1000 may display the revised sub tasks, and additionally revise the revised sub tasks based on a user input.

Figure 8:
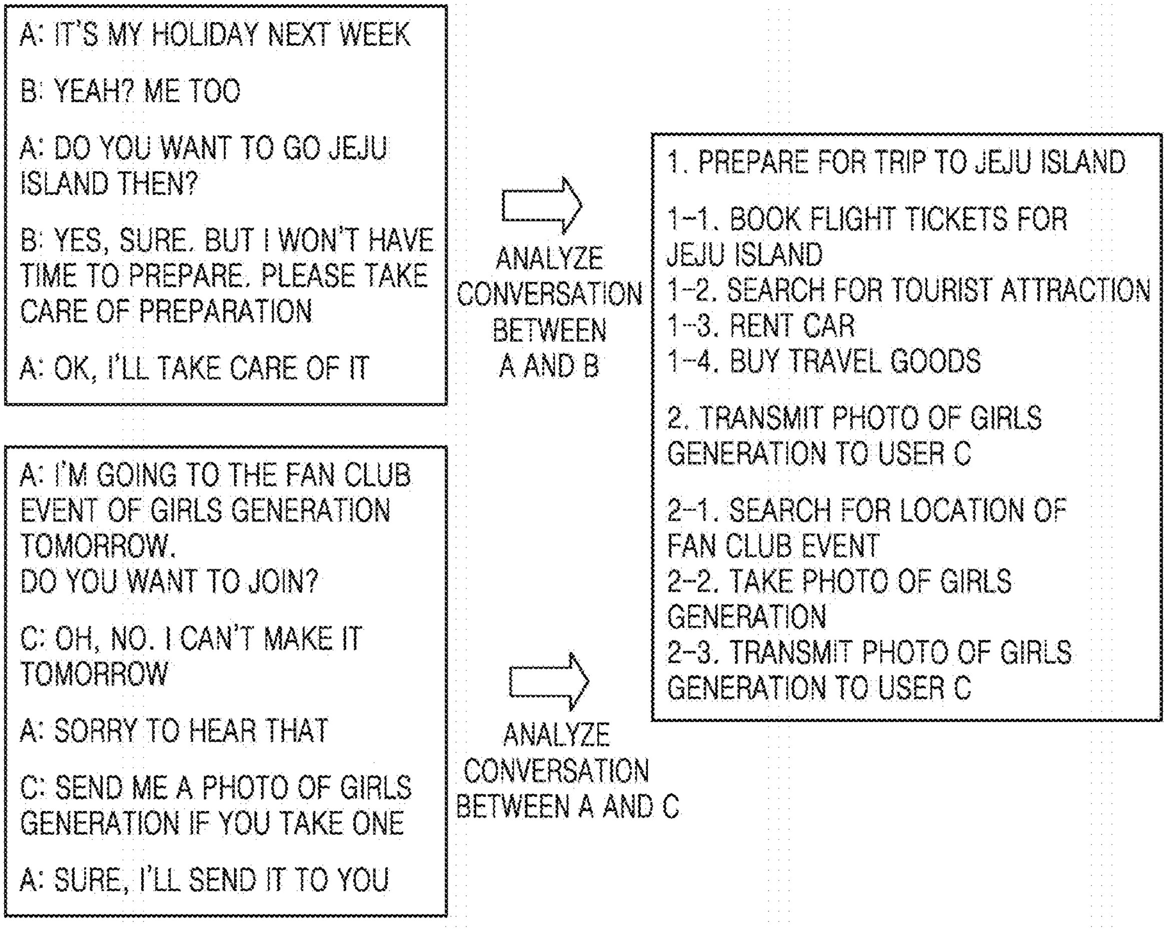
FIG. 8 is a diagram illustrating a to-do list generated by a device based on conversation contents between a user and another user according to an embodiment of the present disclosure.

FIG. 8 is a diagram illustrating a to-do list generated by a device based on conversation contents between a user and another user according to an embodiment of the present disclosure.

Referring to FIG. 8, the device 1000 may generate a to-do list of a user A of the device 1000 by analyzing text indicating conversation contents between the user A and other users. For example, the device 1000 may interpret that the user A and a user B are planning to take a trip to Jeju island based on the question "do you want to go Jeju island?" of the user A and the answer "yes, sure" of the user B from conversation between the user A and the user B. In addition, for example, the device 1000 may determine that the user A needs to prepare for the trip to Jeju island based on "please take care of preparation" of the user B and "ok, I'll take care of it" of the user A from the conversation between the user A and the user B. Accordingly, based on such interpretation, the device 1000 may determine "prepare for trip to Jeju island" as a main task. In addition, the device 1000 may select some of sub tasks in a pre-set list of the sub tasks related to trip preparation and edit the selected sub tasks based on the conversation contents between the user A and the user B, thereby determining "book flight tickets for Jeju island", "search for tourist attraction", "rent car", and "buy travel goods" as sub tasks.

In addition, for example, the device 1000 may determine that only the user A is participating in a fan club event of Girls Generation based on "I'm going to the fan club event of Girls Generation tomorrow. Do you want to join?" of the user A and "Oh, no. I can't make it tomorrow" of a user C based on conversation between the user A and the user C. In addition, the device 1000 may determine that the user A needs to take a photo of Girls Generation in the fan club event tomorrow and send it to the user C by interpreting "send me a photo of Girls Generation if you take it" of the user C and "sure, I'll send it to you" of the user A. Accordingly, based on such interpretation, the device 1000 may determine "transmit photo of Girls Generation to user C" as a main task. In addition, the device 1000 may select some of sub tasks in a pre-set list of the sub tasks related to photo transmission and edit the selected sub tasks based on the conversation contents between the user A and the user B, thereby determining "search for location of fan club event", "take photo of Girls Generation" and "send photo to user C" as sub tasks.

Figure 9:
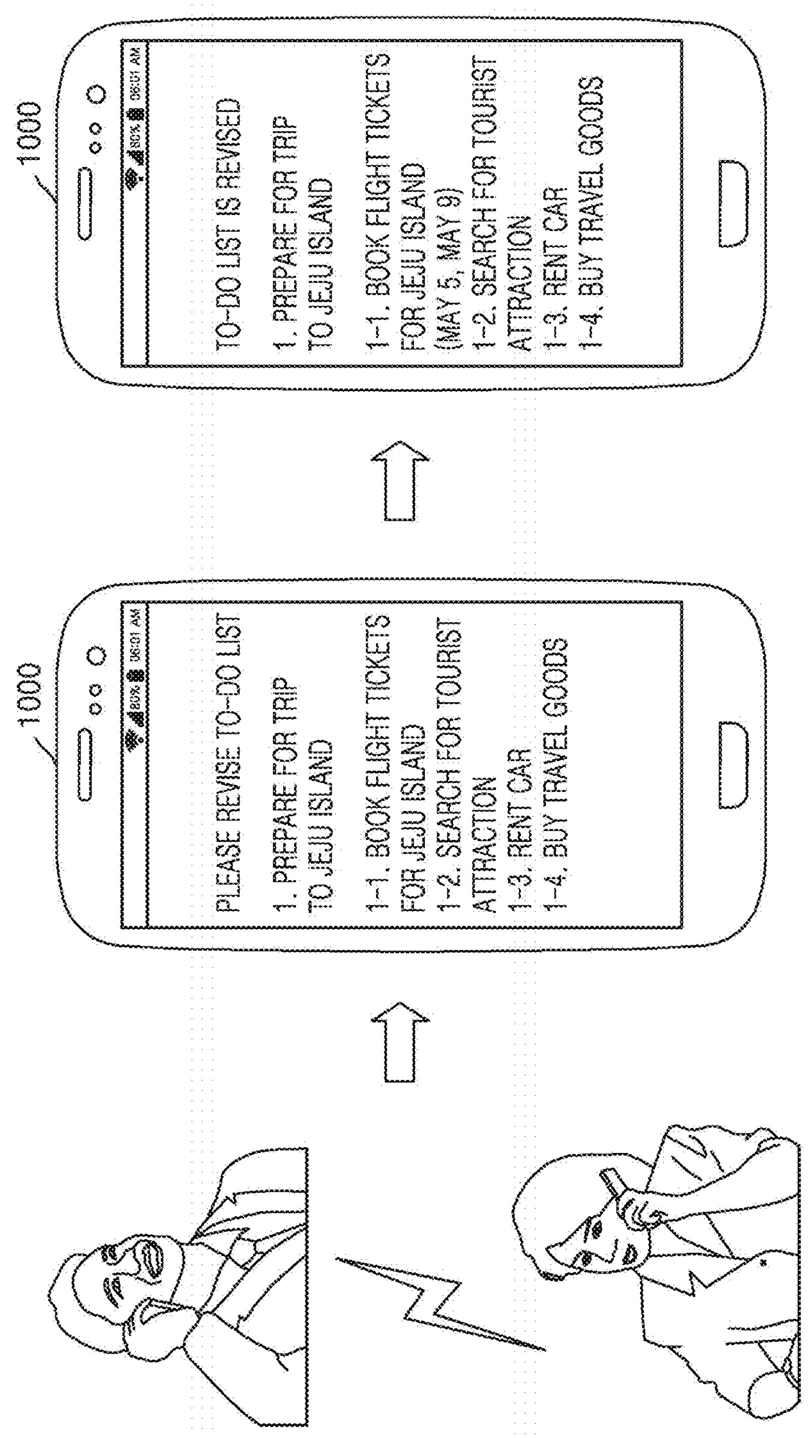
FIG. 9 is a diagram illustrating a device revising a to-do list based on a user input according to an embodiment of the present disclosure.

FIG. 9 is a diagram illustrating a device revising a to-do list based on a user input according to an embodiment of the present disclosure.

Referring to FIG. 9, the device 1000 may display, on the screen, the to-do list of a user. For example, a main task "prepare for trip to Jeju island" and sub tasks "book flight tickets for Jeju island", "search for tourist attraction", "rent car", and "buy travel goods" may be displayed on the screen of the device 1000. In addition, the user may touch "book flight tickets for Jeju island" from among the sub tasks for revision. In addition, the user may add "May 5" and "May 9" to "book flight tickets for Jeju island" as dates for booking flight tickets to revise "book flight tickets for Jeju island" to "book flight tickets for Jeju island (May 5, May 9)".

FIG. 10 illustrates a table of a to-do list generated by a device according to an embodiment of the present disclosure.

Referring to FIG. 10, the table may include a main task field 100, a sub task field 102, and an additional information field 104. Main tasks of a user determined based on behavior information of the user may be recorded in the main task field 100. For example, "prepare for trip to Jeju island", "transmit photo of Girls Generation to user C", "attend Seoul XX exhibition on April 30", and "buy product A" may be recorded. Sub tasks related to the main task may be recorded in the sub task field 102. For example, in relation to "prepare trip to Jeju island", "book flight tickets for Jeju island (May 5, May 9)", "search for tourist attraction", "rent car (May 5 to May 9)", and "buy travel goods" may be recorded.

In addition, additional information related to the main tasks and the sub tasks may be recorded in the additional information field 104. The additional information may be information provided to the user accessorily in relation to performing of a task. Examples of the additional information may include relevant information found by the device 1000 in relation to performing of a task, and information about an operation of the device 1000 for guiding performing of a task. Examples of the relevant information may include destination information, restaurant information, traffic information, and weather information. The additional information related to the main tasks and the sub tasks may be provided to a user, together with notification information of the to-do list, when the device 1000 outputs the notification information to the user. For example, airfare comparing information may be provided to the user in relation to "book flight ticket for Jeju island (May 5, May 9)", recommended tourist attraction information may be provided to the user in relation to "search for tourist attraction", rental fee comparing information may be provided to the user in relation to "rent car (May 5 to May 9)", and price comparing information may be provided to the user in relation to "buy travel goods".

A type of the additional information may be pre-set based on a types and contents of a task, wherein the device 1000 may generate the additional information by searching various types of information on the Internet and provide the additional information to the user. At this time, the device 1000 may provide the additional information while considering preference information of the user. The preference information of the user may be generated based on behavior patterns of the user, and may include, for example, interests of the user, a preferred website of the user, and a preferred product of the user. In addition, the device 1000 may automatically perform an operation for guiding the user to execute a task. For example, in relation to a task of taking and transmitting a photo of Girls Generation to the user C, the device 1000 may execute a camera application and display, on the screen, a phrase "take photo of Girls Generation", and then may automatically execute a chatting application and display, on the screen, a phrase "send photo of Girls Generation to user C".

Figure 11:
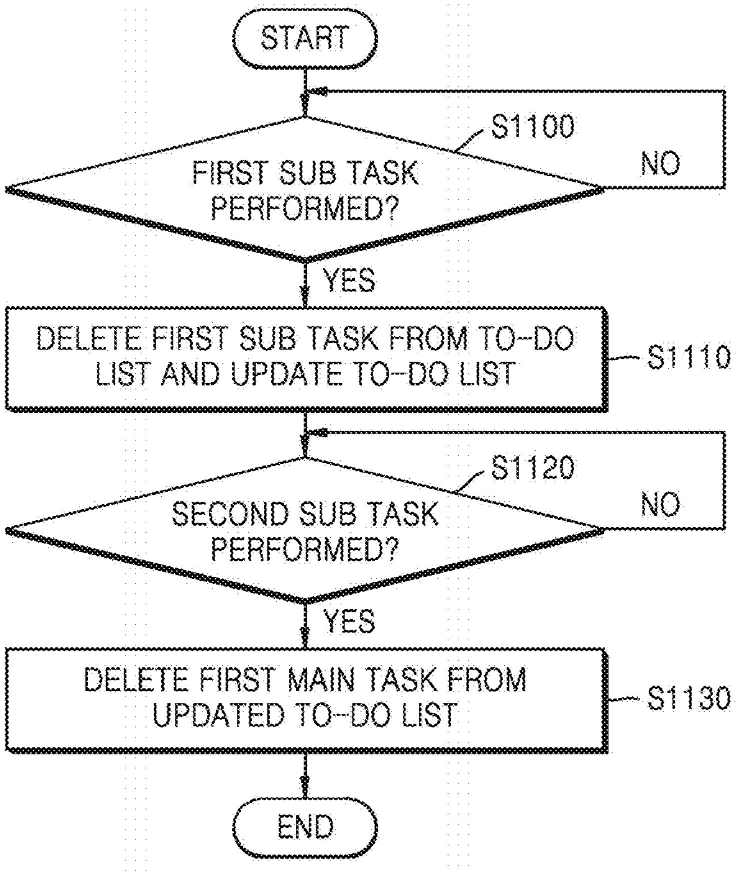
FIG. 11 is a flowchart of a method of updating, by a device, a to-do list according to an embodiment of the present disclosure.

FIG. 11 is a flowchart of a method of updating, by a device, a to-do list according to an embodiment of the present disclosure.

Referring to FIG. 11, it is assumed that a first main task including a first sub task and a second sub task is included in the to-do list.

In operation S1100, the device 1000 may determine whether the first sub task is performed. For example, the device 1000 may determine whether the first sub task is performed by using log information about an operation of the device 1000, log information about an operation of another device 4000 that will be describe later, log information about an operation of the user in the service providing server 3000 that the user is registered to, and log information about an operation of another user in the service providing server 3000 to which the other user is registered.

When it is determined that the first sub task is performed in operation S1100, the device 1000 may delete the first sub task from the to-do list and update the to-do list in operation S1110.

In operation S1120, the device 1000 may determine whether a second sub task is performed. For example, the device 1000 may determine whether the second sub task is performed by using the log information about the operation of the device 1000, the log information about the operation of the other device 4000, the log information about the operation of the user in the service providing server 3000 that the user is registered to, and the log information about the operation of another user in the service providing server 3000 to which the other user is registered.

When it is determined that the second sub task is performed in operation S1120, the device 1000 may delete the first main task including the second sub task from the to-do list in operation S1130.

Figure 12A:
FIGS. 12A, 12B, and 12C are diagrams illustrating a device updating a to-do list according to an embodiment of the present disclosure.
Figure 12B:
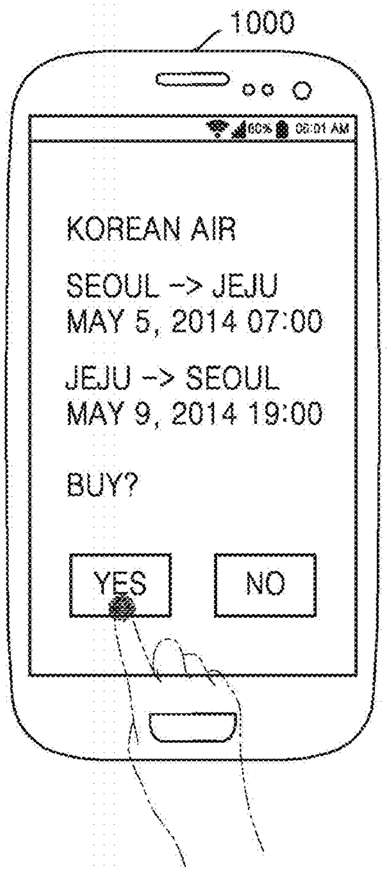
Figure 12C:

FIGS. 12A, 12B, and 12C are diagrams illustrating a device updating a to-do list according to an embodiment of the present disclosure.

Referring to FIG. 12A, the device 1000 may generate the to-do list including a main task "prepare for trip to Jeju island" and sub tasks related to the main task.

Referring to FIG. 12B, a user may buy round-trip flight tickets between Seoul and Jeju island through the device 1000. In this case, the device 1000 may notify the user that the user needs to perform a sub task "book flight tickets for Jeju island", and recommend low-priced flight tickets of an airline the user often uses such that the user easily books flight tickets for Jeju island.

Referring to FIG. 12C, when the user books the flight tickets for Jeju island, the device 1000 may delete the sub task "book flight tickets for Jeju island" from the sub tasks related to the main task "prepare for trip to Jeju island", and update the to-do list.

Figure 13:
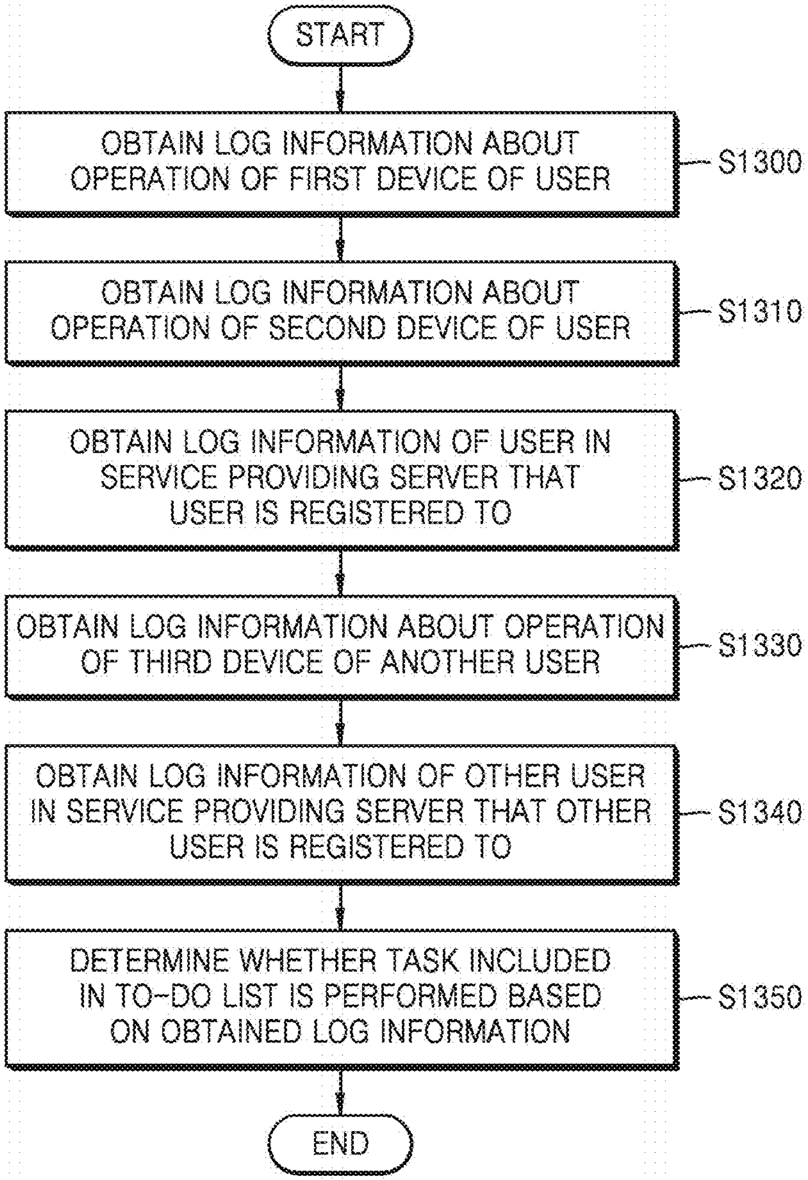
FIG. 13 is a flowchart of a method of determining, by a device, whether a task in a to-do list is performed according to an embodiment of the present disclosure.

FIG. 13 is a flowchart of a method of determining, by a device, whether a task in a to-do list is performed according to an embodiment of the present disclosure.

Referring to FIG. 13, a first device 1001 that will be described later may be the device 1000, and in order to distinguish the device 1000 from a second device 1002 and a third device 4001, which are described later, the device 1000 may be referred to as the first device 1001.

In operation S1300, the first device 1001 may obtain log information about an operation of the first device 1001 of a user. The first device 1001 may collect log information generated by an application executed in the first device 1001, and log information related to an operation of the first device 1001. For example, the first device 1001 may execute a messenger application and obtain log information about exchange of messages and content through the messenger application. Alternatively, for example, the first device 1001 may open an Internet browser and obtain log information about data via a search through the Internet browser. However, an embodiment of the present disclosure is not limited thereto.

In operation S1310, the first device 1001 may obtain log information about an operation of the second device 1002 of the user. The first device 1001 may pre-store device information of the second device 1002 that is another device of the user, and receive the log information about the operation of the second device 1002 from the second device 1002 by using the device information of the second device 1002. Alternatively, the second device 1002 may store the log information about the operation of the second device 1002 in the server 2000, and the first device 1001 may receive the log information about the operation of the second device 1002, which is stored in the server 2000, from the server 2000.

In operation S1320, the first device 1001 may obtain log information of the user in the service providing server 3000 to which the user is registered. The user may use a service provided by the service providing server 3000, and the service providing server 3000 may store log information about a service usage history of the user. In addition, the first device 1001 may use user ID of the service providing server 3000 to receive log information about service use of the user from the service providing server 3000.

In operation S1330, the first device 1001 may obtain log information about an operation of the third device 4001 of another user. The other user may be a user related to a to-do list of the user of the first device 1001. The first device 1001 may determine a meaning of a task in the to-do list, and obtain user information of the other user to perform the task. User information is information about a user and/or a device of the user, and for example, may include a name of the user, a phone number of the user, and service ID of the user, but is not limited thereto.

In addition, the first device 1001 may receive the log information about the operation of the third device 4001 from the third device 4001 by using the user information of the other user. However, an embodiment of the present disclosure is not limited thereto, and the third device 4001 may store the log information about the operation of the third device 4001 in the server 2000, and the first device 1001 may receive, from the server 2000, the log information about the operation of the third device 4001, which is stored in the server 2000.

In operation S1340, the first device 1001 may obtain log information of the other user in the service providing server 3000 to which the other user is registered. The other user may use a service provided by the service providing server 3000, and the service providing server 3000 may store log information about a service usage history of the other user. In addition, the first device 1001 may receive log information about service use of the other user from the service providing server 3000 by using user ID of the other user of the service providing server 3000. In this case, authority of the user to use the log information about the service use of the other user may be pre-set in the service providing server 3000.

In operation S1350, the first device 1001 may determine whether a task included in the to-do list is performed based on the obtained log information. The first device 1001 may use the obtained log information to determine whether the user performed a task in the to-do list through the first device 1001, the second device 1002, and/or the service providing server 3000, and whether the other user performed an operation related to the task in the to-do list through the third device 4001 and/or the service providing server 3000.

Meanwhile, in FIG. 13, the first device 1001 obtains the log information from the second device 1002, the third device 4001, and the service providing server 3000, but an embodiment of the present disclosure is not limited thereto. The first device 1001 may exchange the log information only with the second device 1002 and the third device 4001 without intervention of the service providing server 3000 or the server 2000.

In addition, in FIG. 13, the first device 1001 determines whether the task in the to-do list is performed by using the log information, but an embodiment of the present disclosure is not limited thereto. The first device 1001 may search the Internet for various types of information related to the task in the to-do list, such as news, and determine whether the task in the to-do list is performed by referring to results of the search the Internet.

Figure 14:
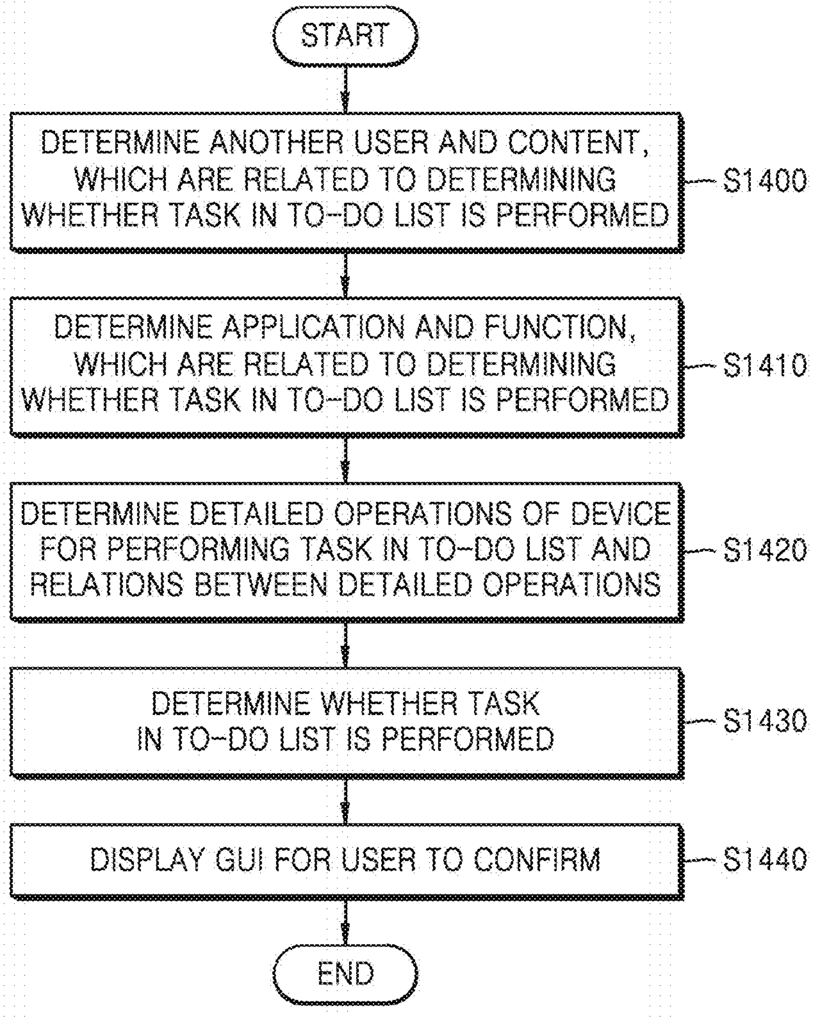
FIG. 14 is a flowchart of a method of determining, by a device, whether a task in a to-do list is performed according to an embodiment of the present disclosure.

FIG. 14 is a flowchart of a method of determining, by a device, whether a task in a to-do list is performed according to an embodiment of the present disclosure.

Referring to FIG. 14, in operation S1400, the device 1000 may determine another user and content, which are related to determining of whether the task in the to-do list is performed. The device 1000 may determine a meaning of the task in the to-do list, and determine the other user and the content, which are related to the performing of the task. For example, when the task in the to-do list is "take photo of Girls Generation and send it to user C", the device 1000 may determine that the other user related to the task is the user C and collect user information about the user C. In addition, the device 1000 may determine that the content related to the task is the photo of Girls Generation, which is taken by the device 1000.

In operation S1410, the device 1000 may determine an application and a function, which are related to the determining of whether the task in the to-do list is performed. For example, when the task in the to-do list is "take photo of Girls Generation and send it to user C", the device 1000 may determine a camera application, a message exchange application, and a web browser from among applications installed in the device 1000 as applications related to the task. In addition, the device 1000 may determine a function of taking a photo, a function of determining a location and time of taking a photo, and a function of storing a photo of the camera application as functions related to the task. In addition, the device 1000 may determine a function of inputting a recipient, a function of enclosing a photo, and a function of transmitting a photo of the message exchange application as functions related to the task.

In addition, for example, when the task in the to-do list is "book flight tickets for Jeju island", the device 1000 may determine an application that may be used to book flight tickets from among applications installed in the device 1000. In addition, the device 1000 may determine a function that may be used to book flight tickets from among functions of the determined application.

In operation S1420, the device 1000 may determine detailed operations of the device 1000 for performing the task in the to-do list and relations between the detailed operations. The device 1000 may define the detailed operations of the device 1000, which are required to perform the task, by combining some or all of the application, the function, the other user, and the content, which are determined in operations S1400 and S1410. In addition, the device 1000 may determine the relations between the defined detailed operations, and generate a relation graph indicating the relations between the detailed operations. The relations between the detailed operations will be described below with reference to FIG. 15.

In operation S1430, the device 1000 may determine whether the task in the to-do list is performed. As some or all of the detailed operations are performed, the device 1000 may determine whether the task in the to-do list is being performed or has been performed by considering the relations between the detailed operations.

In operation S1440, the device 1000 may display, on the screen, a GUI for the user to confirm the determination of whether the task is performed. The device 1000 may display, on the screen, a list of tasks determined to be performed, and verify determination of whether the task is performed based on a user input of confirming that the task is performed.

Meanwhile, in FIG. 14, the detailed operations to be performed by the device 1000 and the relations between the detailed operations are determined, and it is also determined whether the task in the to-do list is performed based on the determined relations, but an embodiment of the present disclosure is not limited thereto. The device 1000 may determine detailed operations that are to be performed by not only the device 1000, but also by another device of the user, another device of another user, the server 2000, and the service providing server 3000, and relations between the detailed operations, and determine whether the task in the to-do list is performed based on the determined relations.

Figure 15:
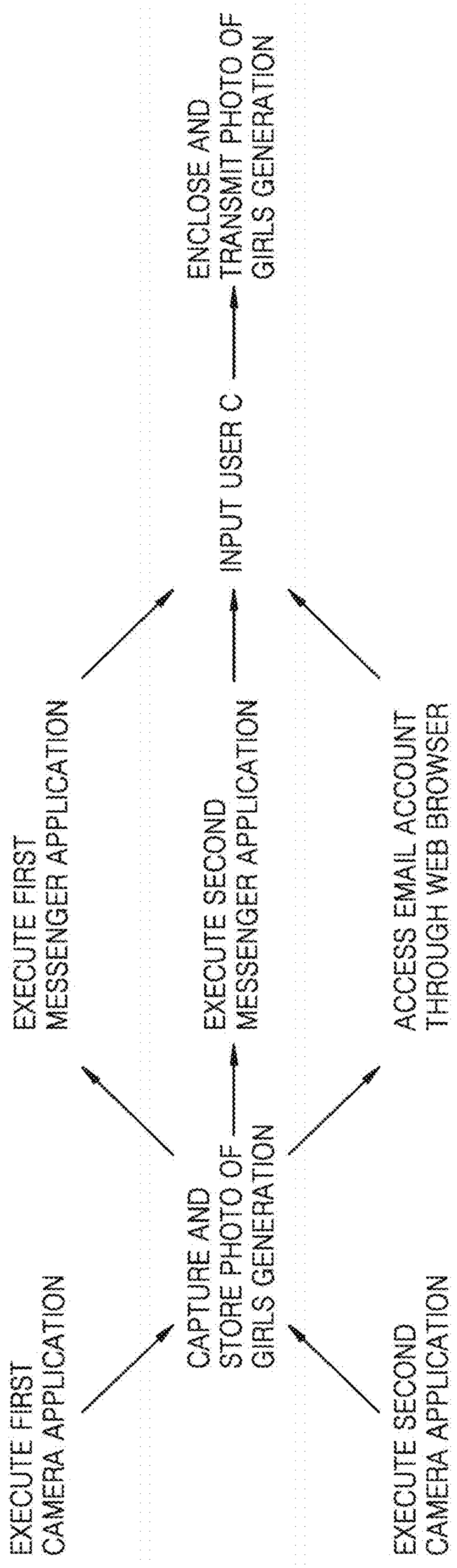
FIG. 15 is a diagram illustrating relations between operations related to performing a task according to an embodiment of the present disclosure.

FIG. 15 is a diagram illustrating relations between operations related to performing a task according to an embodiment of the present disclosure.

Referring to FIG. 15, in relation to a task "take photo of Girls Generation and send it to user C", "execute first camera application", "execute second camera application", "take and store photo of Girls Generation", "execute first messenger application", "execute second messenger application", "access email account through web browser", "input user C", and "enclose and store photo of Girls Generation" may be determined as detailed operations. In this case, the first camera application, the second camera application, the first messenger application, the second messenger application, and the web browser may be applications installed in the device 1000.

In addition, the device 1000 may define "execute first camera application" and "execute second camera application" as selective detailed operations, and "execute first messenger application", "execute second messenger application", and "access email account through web browser" as selective detailed operations.

In addition, the device 1000 may generate a graph shown in FIG. 15 indicating relations between the detailed operations for executing the task "take photo of Girls Generation and send it to user C", and monitor performance paths of the detailed operations in the graph to determine whether the task is being performed or has been performed.

FIG. 16 is a flowchart of a method of outputting, by a device, notification information indicating an unperformed task, according to an embodiment of the present disclosure.

Referring to FIG. 16, in operation S1600, the device 1000 may set a notification time of an unperformed task in a to-do list. The device 1000 may set a performance deadline according to tasks in the to-do list, and set a notification time for notifying that a task is not performed before a deadline passes. For example, the device 1000 may set the notification time such that notification information is output according to pre-set cycles. Alternatively, for example, the device 1000 may set the notification time such that notification information is output when a pre-set event, such as execution of a certain application, a certain time being reached, reception of a question from a certain user, and the like, is generated. For example, the device 1000 may set the notification time such that notification information of an unperformed task is output when an application related to performing of a task in the to-do list is executed.

In operation S1610, the device 1000 may generate notification information including a notification basis. The device 1000 may generate a natural language notifying what an unperformed task is, and a natural language of a basis for determining that a task is unperformed. For example, the device 1000 may generate a natural language, such as "Did you send photo your friend C requested? You have no history of searching for photo or sending photo" or "Did you answer to question from section chief C three days ago? You have no history of answering back".

In addition, the device 1000 may convert the generated natural language to voice, or generate a moving image including the generated natural language.

In operation S1620, the device 1000 may output the notification information of the unperformed task in the to-do list. The device 1000 may output the notification information including the notification basis at the notification time set in operation S1600. The device 1000 may display, on the screen, the notification information in a form of text or an image, or may output the notification information in a form of voice through a speaker of the device 1000.

In addition, the device 1000 may display, on the screen, additional information about performing of a task. The additional information may be information accessorily provided to a user in relation to the performing of the task. The additional information may include, for example, relevant information found by the device 1000 in relation to the performing of the task, and information about an operation of the device 1000 for guiding the performing of the task. In addition, in order to guide the user to perform the task, the device 1000 may automatically execute a certain operation and display the additional information. For example, in relation to a task of taking and sending a photo of Girls Generation to the user C, the device 1000 may execute a camera application and display, on the screen, a phrase "take photo of Girls Generation", and may automatically execute a chatting application and display, on the screen, a phrase "enclose photo of Girls Generation and send it to user C".

Meanwhile, the device 1000 may provide the notification information in any one of various forms. For example, the device 1000 may output the notification information to perform a certain task selected from the to-do list. In addition, for example, the device 1000 may output the notification information for notifying the to-do list in units of days, weeks, or months. In addition, for example, the device 1000 may display a plurality of tasks in the to-do list and distinguishably display a task determined to be currently performed from among the plurality of tasks.

FIG. 17 illustrates a notification time table indicating a notification time of notification information according to an embodiment of the present disclosure.

Referring to FIG. 17, the notification time table may include a task field 170 and a notification time field 172. Content of a task included in a to-do list may be recorded in the task field 170. However, an embodiment of the present disclosure is not limited thereto, and an ID value for identifying the task may be recorded in the task field 170.

In addition, information about a notification time when notification information indicating that a task is unperformed is output may be recorded in the notification time field 172. For example, time information indicating a notification time, such as "May 3, 2014 15:00", may be recorded in the notification time field 172. In addition, for example, information indicating a certain event related to a notification time, such as "when Internet browser is executed", may be recorded in the notification time field 172. The certain event may include not only an event of executing a certain application, but also an event of executing a certain function in the certain application, but an embodiment of the present disclosure is not limited thereto.

Figure 18:
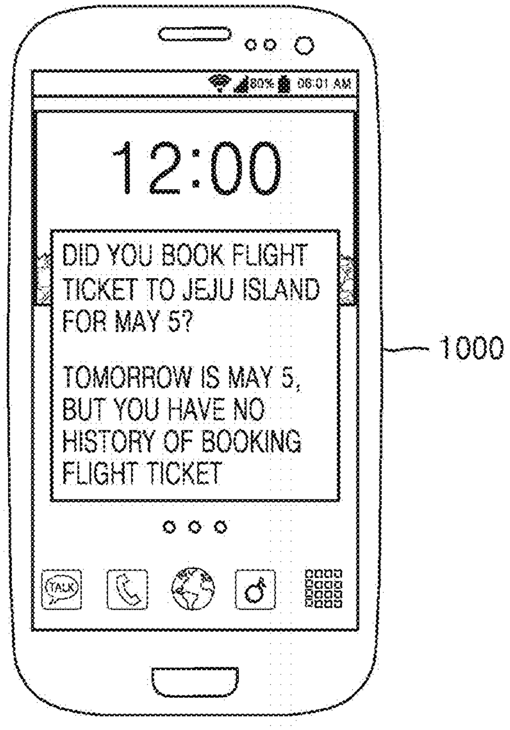
FIG. 18 is a diagram illustrating a device outputting notification information according to an embodiment of the present disclosure.

FIG. 18 is a diagram illustrating a device outputting notification information according to an embodiment of the present disclosure.

Referring to FIG. 18, when it is a notification time for notifying an unperformed task, the device 1000 may display, on the screen, a popup window including notification information, such as "Did you book flight ticket to Jeju island for May 5? Tomorrow is May 5, but you have no history of booking flight ticket".

Figure 19:
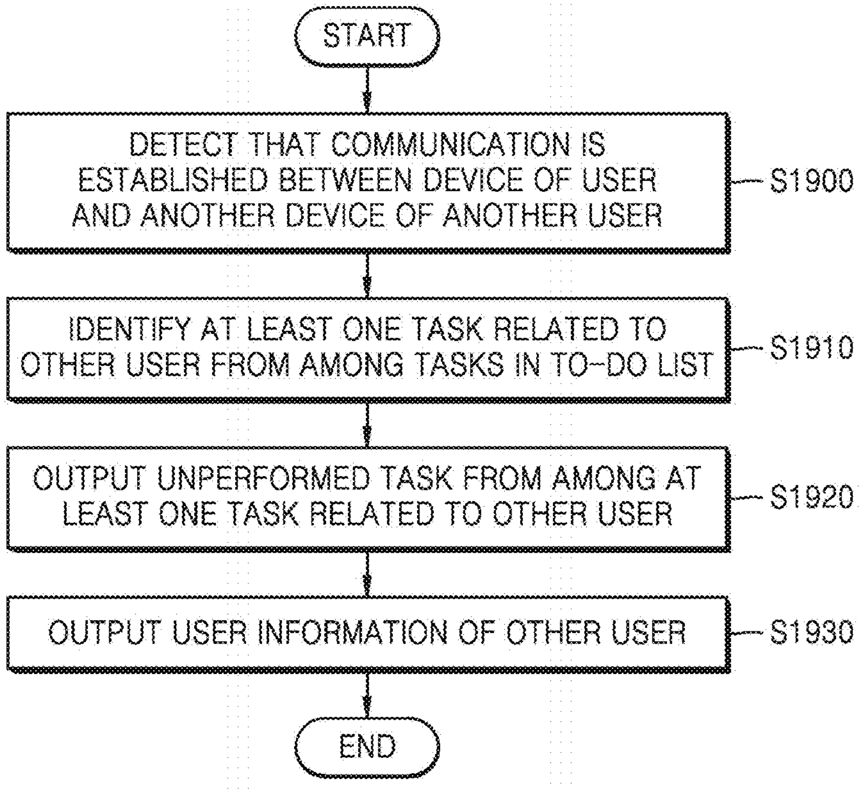
FIG. 19 is a flowchart of a method of notifying a user of an unperformed task related to another user as a device of the user establishes communication with another device of the other user according to an embodiment of the present disclosure.

FIG. 19 is a flowchart of a method of notifying a user of an unperformed task related to another user as a device of the user establishes communication with another device of the other user according to an embodiment of the present disclosure.

Referring to FIG. 19, in operation S1900, the device 1000 may detect that the communication is established with the other device 4000 of the other user. For example, when the device 1000 calls the other device 4000 or the other device 4000 calls the device 1000, the device 1000 may establish communication for a phone call with the other device 4000. In addition, when the device 1000 transmits a message to the other device 4000 or the other device 4000 transmits a message to the device 1000, the device 1000 may establish communication for exchanging messages with the other device 4000.

In operation S1910, the device 1000 may identify at least one task related to the other user from among tasks in a to-do list. The device 1000 may obtain user information about the other user of the other device 4000 that established the communication with the device 1000 and identify at least one task related to the other user from among the tasks in the to-do list of the user by using the obtained user information.

In operation S1920, the device 1000 may output an unperformed task from among the at least one task related to the other user. The device 1000 may use log information of the user stored in the device 1000, the other device 4000, and the service providing server 3000 to determine whether the at least one task related to the other user from among the tasks included in the to-do list is performed. In addition, the device 1000 may display, on the screen, or output, through the speaker, a list of at least one unperformed task from among the at least one task related to the other user. The device 1000 may output the list of at least one unperformed task as the communication is established with the other device 4000.

In operation S1930, the device 1000 may output the user information of the other user. The device 1000 may output the user information of the other user while outputting the list of at least one unperformed task. For example, the device 1000 may output a name of the other user, a recent call time, and a recent message exchange time. In addition, the device 1000 may collect information about a recent status of the other user from the service providing server 3000 of the other user, and output the collected information. For example, the device 1000 may collect statuses about a promotion, a turnover, a move, and a birthday of the other user. In this case, the device 1000 may pre-obtain an authority to collect the user information of the other user, periodically collect the user information of the other user, and summarize and store the collected user information in text.

When the user of the device 1000 receiving a call from the other user does not know the other user well, or when a profile of the other user is not open to the public on a webpage of the other user or in an SNS server that the other user is registered to, the device 1000 may analyze information (for example, a telephone conversation, a chatting content, a text content, and the like) related to recent communication with the other user, and summarize and provide, to the user, a relationship between the other user and the user and a task related to the other user. In addition, when the communication with the other user is ended, the device 1000 may summarize, tag, and store information related to the communication.

Figure 20A:
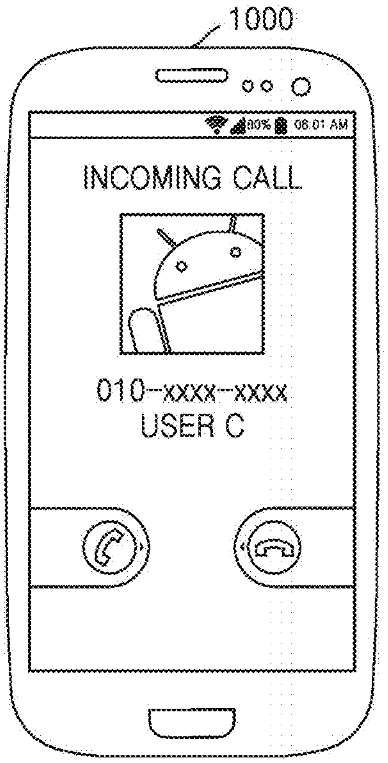
FIGS. 20A and 20B are diagrams illustrating a device outputting an unperformed task related to another user of another device as the device receives and transmits a phone call from and to the other device according to an embodiment of the present disclosure.
Figure 20B:
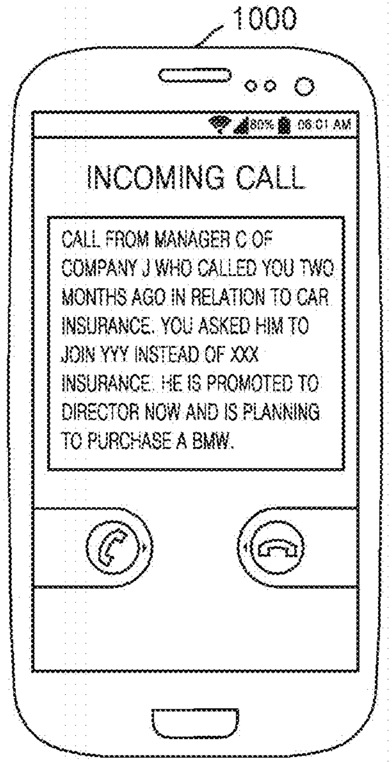

FIGS. 20A and 20B are diagrams illustrating a device outputting an unperformed task related to the other user of another device as the device receives and transmits a phone call from and to the other device according to an embodiment of the present disclosure.

Referring to FIG. 20A, the device 1000 may receive a call signal from the other device 4000, and display, on the screen, call information of the other device 4000.

In FIG. 20A, the device 1000 displays the call information of the other device 4000, but an embodiment of the present disclosure is not limited thereto. The device 1000 may additionally display user information of the user C, who is the other user.

Referring to FIG. 20B, the device 1000 may display an unperformed task related to the user C. In this case, the device 1000 may display the unperformed task in a dialogue style, and also display the user information of the user C. For example, the device 1000 may display, on the screen, "Call from manager C of company J, who called you two months ago in relation to car insurance. You asked him to join YYY insurance instead of XXX insurance. He is promoted to director now and is planning to purchase a BMW".

Figure 21:
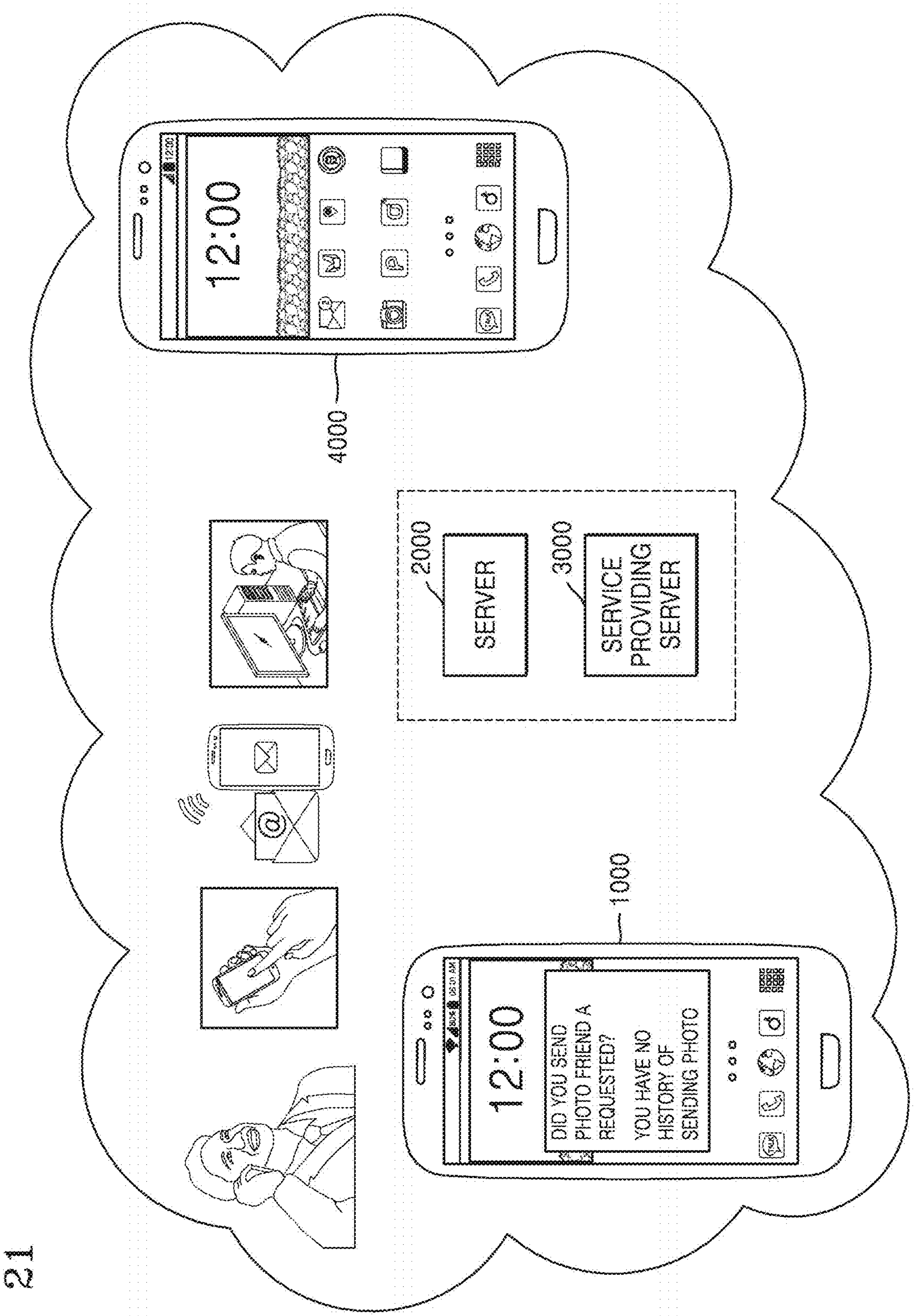
FIG. 21 is a diagram illustrating a to-do list notification system notifying a user of a to-do list of the user through a device according to an embodiment of the present disclosure.

FIG. 21 is a diagram illustrating a to-do list notification system notifying a user of a to-do list of the user through a device according to an embodiment of the present disclosure.

Referring to FIG. 21, the to-do list notification system, according to an embodiment of the present disclosure, may include the at least one device 1000 of the user, the server 2000, the at least one service providing server 3000, and the at least one other device 4000 of the other user. In addition, the server 2000 may perform some of functions of the device 1000 described above with reference to FIGS. 1 through 20 such that the to-do list of the user is output through the device 1000.

The server 2000 may be a server providing a service of providing the to-do list of the user, and the service providing server 3000 may be a server providing various services other than the service of providing the to-do list. For example, the service providing server 3000 may be a mobile carrier server, an SNS server, a game service providing server, a content sharing service providing server, or a broadcasting service providing server, but is not limited thereto. In addition, the server 2000 and the service providing server 3000 may be operated by individual operators, but an embodiment of the present disclosure is not limited thereto. The server 2000 and the service providing server 3000 may be operated by one operator.

The server 2000 may determine an obligation of the user by analyzing a behavior of the user, and notify the user, through the device 1000, that the obligation is not performed. The server 2000 may obtain behavior information of the user from the at least one device 1000 of the user and the service providing server 3000 the user is registered to, and generate the to-do list of the user by analyzing the behavior information. For example, the server 2000 may analyze a behavior, such as a phone call of the user, a message transmission of the user, and an email transmission of the user, using the device 1000 and/or the service providing server 3000 to generate a list of obligations of the user. In addition, the server 2000 may determine whether the user performed the obligation by monitoring the behavior of the user, and notify the user of the obligation. The server 2000 may monitor the behavior of the user through the device 1000 and/or the service providing server 3000, and behavior of the other user through the other device 4000 and/or the service providing server 3000 to determine an unperformed task from among tasks in the to-do list of the user. In addition, the server 2000 may output a reason for notifying the obligation to the user through the device 1000.

The other device 4000 may be a smart phone, a tablet PC, a PC, a smart TV, a mobile phone, a PDA, a laptop, a media player, a micro-server, a GPS apparatus, an electronic book terminal, a digital broadcasting terminal, a navigation, a kiosk, an MP3 player, a digital camera, or another mobile or non-mobile computing apparatus, but is not limited thereto. In addition, the device 1000 may be a wearable device, such as a watch, glasses, a hair band, a ring, and the like, which includes a communication function and a data processing function.

In addition, according to an embodiment of the present disclosure, the device 1000 and the other device 4000 may be connected to each other via at least one of various wired and wireless communication units. For example, the device 1000 and the other device 4000 may be connected to each other through a communication unit, such as Bluetooth or Wi-Fi communication, but the embodiment of the present disclosure is not limited thereto.

In addition, the server 2000 and the service providing server 3000 may be operated by one operator. However, an embodiment of the present disclosure is not limited thereto, and the server 2000 and the service providing server 3000 may be operated by different operators. Alternatively, the server 2000 and the service providing server 3000 may be operated as one integrated server.

Figure 22:
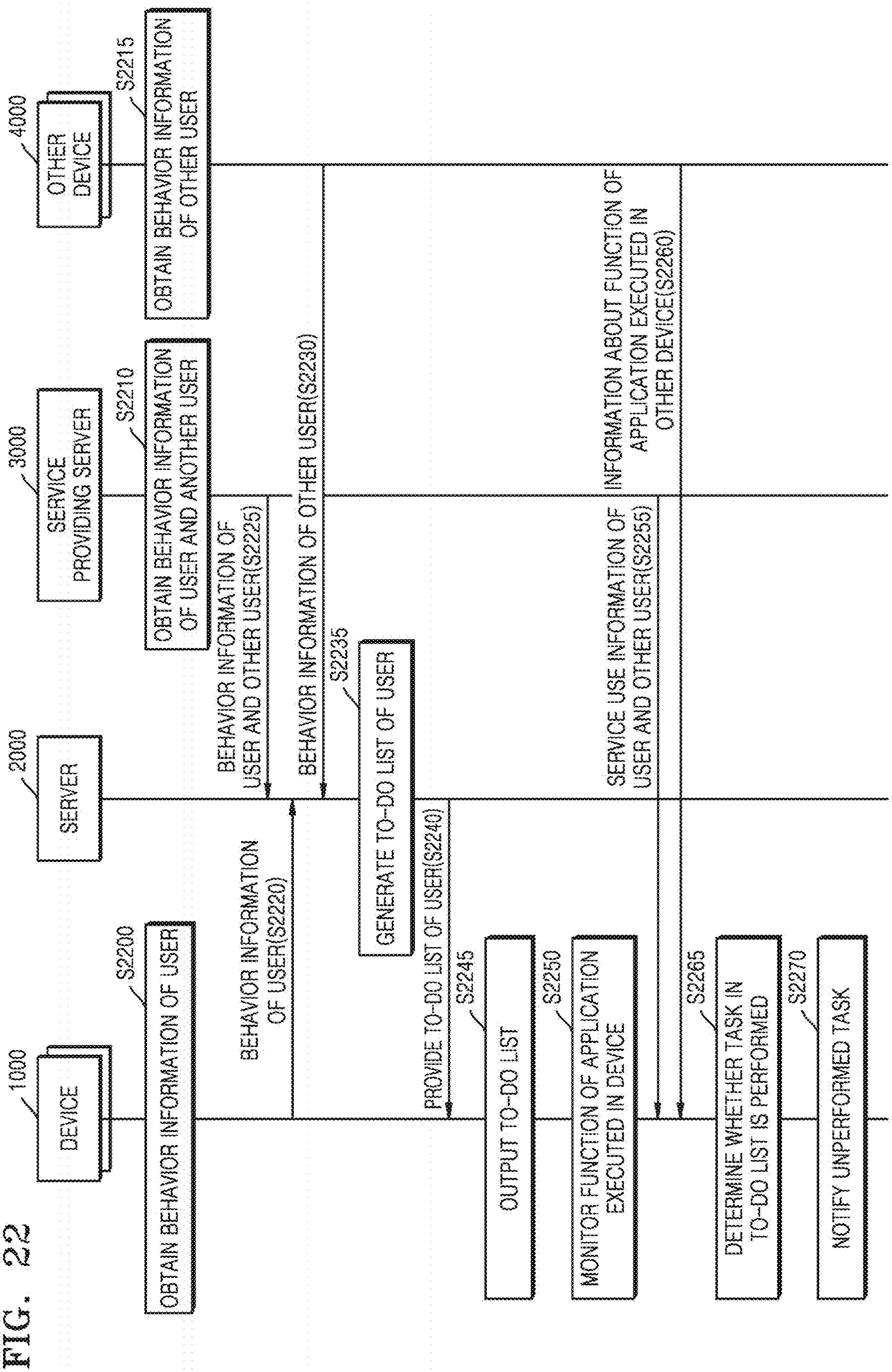
FIG. 22 is a flowchart of a method of generating, by a server, a to-do list, and determining and notifying, by a device, an unperformed task from among tasks in the to-do list according to an embodiment of the present disclosure.

FIG. 22 is a flowchart of a method of generating, by a server, a to-do list, and determining and notifying, by a device, an unperformed task from among tasks in the to-do list according to an embodiment of the present disclosure.

Referring to FIG. 22, in operation S2200, the device 1000 may obtain behavior information of a user through the device 1000. For example, the device 1000 may obtain information about telephone conversation through the device 1000, contents of messages exchanged through the device 1000, contents of emails exchanged through the device 1000, contents of memos recorded in the device 1000, contents of voice memos recorded in the device 1000, and a schedule of the user stored in the device 1000.

In operation S2210, the service providing server 3000 may obtain behavior information of the user and another user through the service providing server 3000. The user and the other user may use various services provided by the service providing server 3000, and the service providing server 3000 may obtain the behavior information of the user and the other user based on log information about the user and the other user using the services. For example, the service providing server 3000 may provide an SNS, a message exchange service, a communication service, a schedule management service, a content providing service, and a search service, but is not limited thereto.

In operation S2215, the other device 4000 may obtain behavior information of the other user through the other device 4000. For example, the other device 4000 may obtain information about telephone conversation through the other device 4000, contents of messages exchanged through the other device 4000, contents of emails exchanged through the other device 4000, contents of memos recorded in the other device 4000, contents of voice memos recorded in the other device 4000, and contents of a schedule of the other user stored in the other device 4000.

In operation S2220, the device 1000 may provide the obtained behavior information of the user to the server 2000, in operation S2225, the service providing server 3000 may provide the obtained behavior information of the user and the other user to the server 2000, and in operation S2230, the other device 4000 may provide the obtained behavior information of the other user to the server 2000.

In addition, the behavior information of the user and the behavior information of the other user may be synchronized and stored in the device 1000, the server 2000, the service providing server 3000, and the other device 4000.

In operation S2235, the server 2000 may generate a to-do list of the user by analyzing the behavior information of the user and/or the other user. The server 2000 may generate the to-do list of the user by identifying the other user related to behavior of the user based on the behavior information of the user and analyzing the behavior information of the identified other user and the behavior information of the user.

The server 2000 may analyze communication contents between the user and the other user, and determine an obligation of the user based on the analyzed communication contents. For example, the server 2000 may analyze the communication contents between the user and the other user by using at least one of various data mining technologies. In addition, for example, the server 2000 may analyze the communication contents between the user and the other user by using at least one of various natural language interpreting technologies. In this case, the server 2000 may interpret a meaning of the communication contents between the user and the other user through natural language processing methods, such as morpheme analysis and construction analysis.

In addition, the server 2000 may determine the obligation of the user by analyzing the memos and the schedule of the user recorded in the device 1000, the other device 4000 and/or the service providing server 3000. The server 2000 may analyze the memos and the schedule of the user by using at least one of various data mining technologies and natural language interpreting technologies.

In addition, the server 2000 may determine the obligation of the user by analyzing operations of the device 1000 and/or the other device 4000, which are performed through applications installed in the device 1000 and/or the other device 4000. At this time, the server 2000 may determine the obligation of the user by using log information about the applications.

The obligation of the user may include a simple task or a complex task. A simple task may include one task, such as "transmit file" and "transmit email". A complex task may include a main task and a sub task. For example, the complex task may include a main task, such as "prepare for trip" and sub tasks, such as "book flight ticket", "search for tourist attraction", "rent car", and "buy travel goods".

In addition, the server 2000 may verify authenticity of the to-do list by comparing the behavior information obtained from the device 1000, the behavior information obtained from the other device 4000, and the behavior information obtained from the service providing server 3000.

In operation S2240, the server 2000 may provide the to-do list of the user to the device 1000. The server 2000 may provide the to-do list of the user to the device 1000 in response to a request from the device 1000. The server 2000 may provide the to-do list of the user to the device 1000 in pre-set cycles. The server 2000 may provide the to-do list of the user to the device 1000 when a pre-set event is generated. At this time, the pre-set event may include generation and update of the to-do list of the user, but is not limited thereto.

In addition, the to-do list of the user may be synchronized and stored in the device 1000, the server 2000, the service providing server 3000, and the other device 4000.

In operation S2245, the device 1000 may output the to-do list of the user. The device 1000 may display, on the screen, the to-do list of the user, and provide an editing tool for editing the to-do list of the user to the user. The device 1000 may revise the to-do list based on a user input through the editing tool.

In operation S2250, the device 1000 may monitor a function of an application executed in the device 1000. The device 1000 may determine the other user and content related to determining of whether a task in the to-do list is performed. In addition, the device 1000 may identify an application and a function of the application related to the to-do list and monitor whether the identified function is performed.

In operation S2255, the service providing server 3000 may receive service use information of the user and the other user. In this case, the device 1000 may request the service providing server 3000 for the service use information of the user and the other user by providing service ID of the user and service ID of the other user related to the to-do list of the user to the service providing server 3000.

In operation S2260, the other device 4000 may provide information about a function of an application executed in the other device 4000 to the device 1000. In this case, the device 1000 may request the other device 4000 for the information about the function of the application executed in the other device 4000 by identifying a task related to the other user from among the tasks in the to-do list of the user and providing information about an application and a function of the application related to the performing of the identified task to the other device 4000.

In addition, information about the function monitored in operation S2250, the service use information of the user and the other user received in operation S2255, and the information about the function provided in operation S2260 may be synchronized and stored in the device 1000, the server 2000, the service providing server 3000, and the other device 4000.

In operation S2265, the device 1000 may determine whether the task in the to-do list of the user is performed. The device 1000 may determine detailed operations of the device 1000, the other device 4000, and the service providing server 3000 for performing the task in the to-do list and relations between the detailed operations by using results of the monitoring in operation S2250 and the service use information and the information received in operations S2255 and S2260, and determine whether the task is performed by considering the determined relations.

In addition, the device 1000 may determine an unperformed task in the to-do list and update the to-do list. The device 1000 may delete a performed task from the to-do list, and when a detailed task related to the performed task exists, the device 1000 may add the detailed task to the to-do list.

In operation S2270, the device 1000 may output notification information notifying the unperformed task from among the tasks in the to-do list. The notification information may include information about a reason for notifying the unperformed task. In addition, a notification time when the notification information is output may be pre-set.

In addition, the device 1000 may output additional information related to performing of the unperformed task of the user. In addition, the device 1000 may provide a guide for performing the unperformed task to the user. For example, the device 1000 may recommend the user detailed operations for performing the unperformed task or automatically perform some of the detailed operations.

Figure 23:
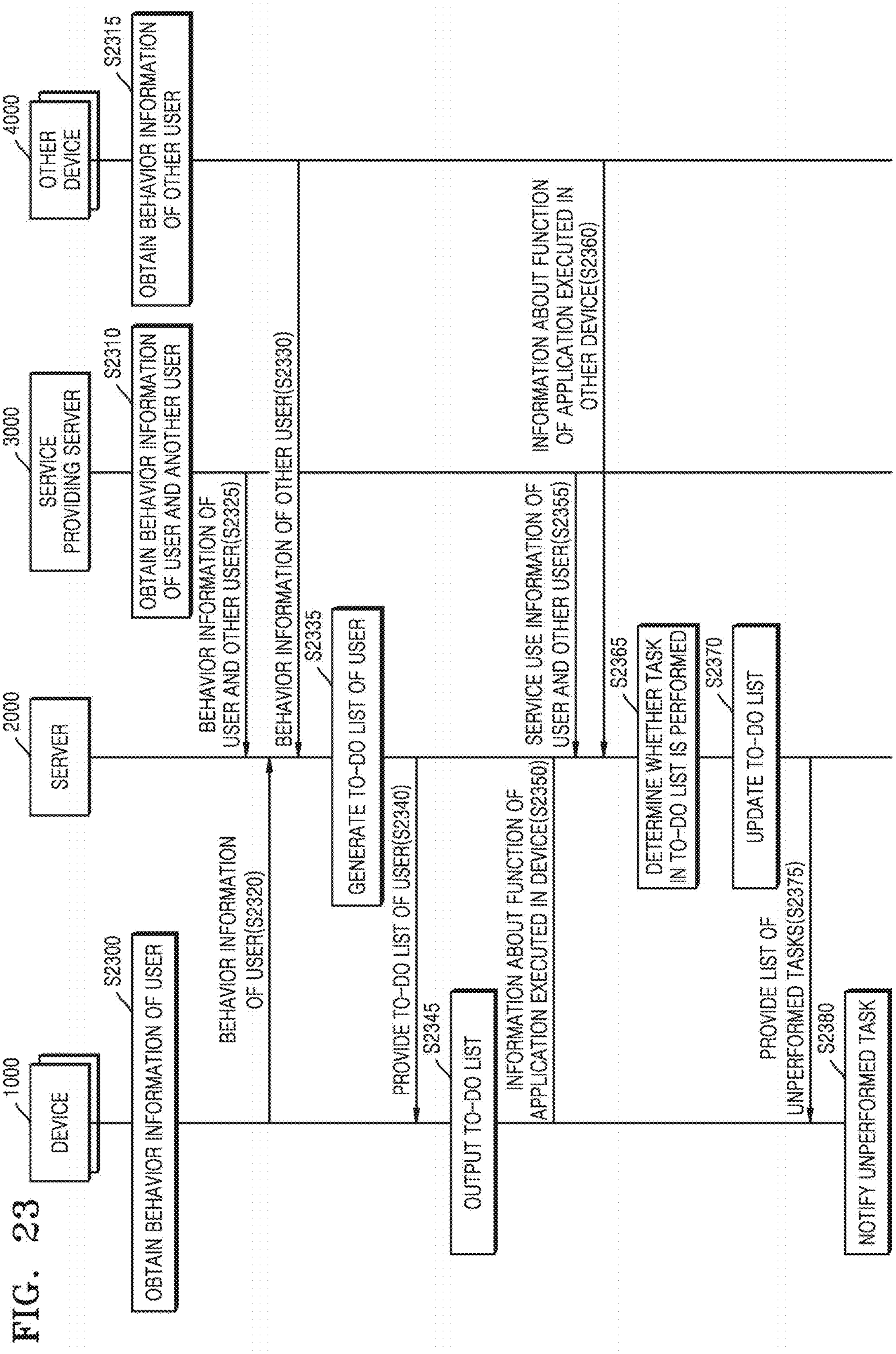
FIG. 23 is a flowchart of a method of generating, by a server, a to-do list, determining, by the server, an unperformed task from among tasks in the to-do list, and notifying, by a device, the unperformed task according to an embodiment of the present disclosure.

FIG. 23 is a flowchart of a method of generating, by a server, a to-do list, determining, by a server, an unperformed task from among tasks in the to-do list, and notifying, by a device, the unperformed task according to an embodiment of the present disclosure.

Referring to FIG. 23, since operations S2300 through S2345 respectively correspond to operations S2200 through S2245, details thereof are not provided again for convenience of description.

In operation S2350, the device 1000 may provide information about a function of an application executed in the device 1000 to the server 2000. The device 1000 may determine the other user and content related to determining of a task in the to-do list. In addition, the device 1000 may identify an application and a function of the application related to the to-do list of the user and provide to the server 2000 information about whether the identified function is performed.

In operation S2355, the service providing server 3000 may provide to the server 2000 service use information of the user and the other user. Here, the server 2000 may request the service providing server 3000 for the service use information of the user and the other user by providing service ID of the user and service ID of the other user related to the to-do list of the user to the service providing server 3000.

In operation S2360, the other device 4000 may provide, to the server 2000, information about a function of an application executed in the other device 4000. Here, the sever 2000 may request the other device 4000 for the information about the function of the application executed in the other device 4000 by identifying a task related to the other user from among the tasks in the to-do list of the user and providing information about an application and a function of the application related to performing of the identified task to the other device 4000.

In addition, information about the function monitored in operation S2350, the service use information of the user and the other user provided in operation S2355, and the information about the function provided in operation S2360 may be synchronized and stored in the device 1000, the server 2000, the service providing server 3000, and the other device 4000.

In operation S2365, the server 2000 may determine whether the task in the to-do list of the user is performed. The device 1000 may determine detailed operations of the device 1000, the other device 4000, and the service providing server 3000 for performing the task in the to-do list and relations between the detailed operations by using the information, the service use information, and the information received in operations S2350 through S2360, and determine whether the task is performed by considering the determined relations.

In operation S2370, the server 2000 may update the to-do list based on an unperformed task in the to-do list. The server 2000 may delete a performed task from the to-do list, and when a detailed task related to the performed task exists, the server 2000 may add the detailed task to the to-do list. In addition, the updated to-do list may be synchronized and stored in the device 1000, the server 2000, the service providing server 3000, and the other device 4000.

In addition, the server 2000 may generate additional information related to performing of the unperformed task of the user. In addition, the server 2000 may generate guide information for performing the unperformed task. For example, the server 2000 may recommend the user detailed operations for the device 1000 to perform the unperformed task, or generate additional information and/or guide information for automatically performing some of the detailed operations.

In operation S2375, the server 2000 may provide a list of unperformed tasks to the device 1000. The server 2000 may provide, to the device 1000, notification information including a reason for notifying the unperformed tasks.

In operation S2380, the device 1000 may output notification information for notifying an unperformed task from among the tasks in the to-do list. Here, the notification information may include information about a reason for notifying the unperformed task. In addition, a notification time when the notification information is output may be pre-set. In addition, the device 1000 may output additional information related to performing of the unperformed task of the user. In addition, the device 1000 may provide, to the user, a guide for performing the unperformed task.

Figure 24:
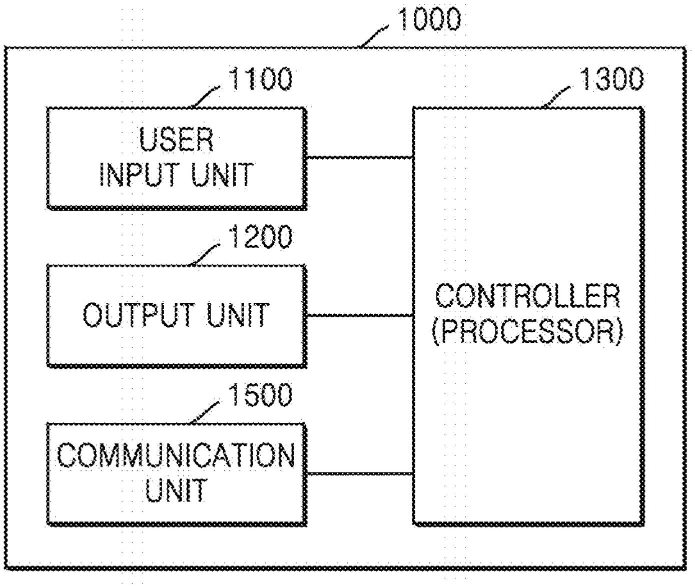
FIGS. 24 and 25 are block diagrams of a device according to various embodiments of the present disclosure.
Figure 25:
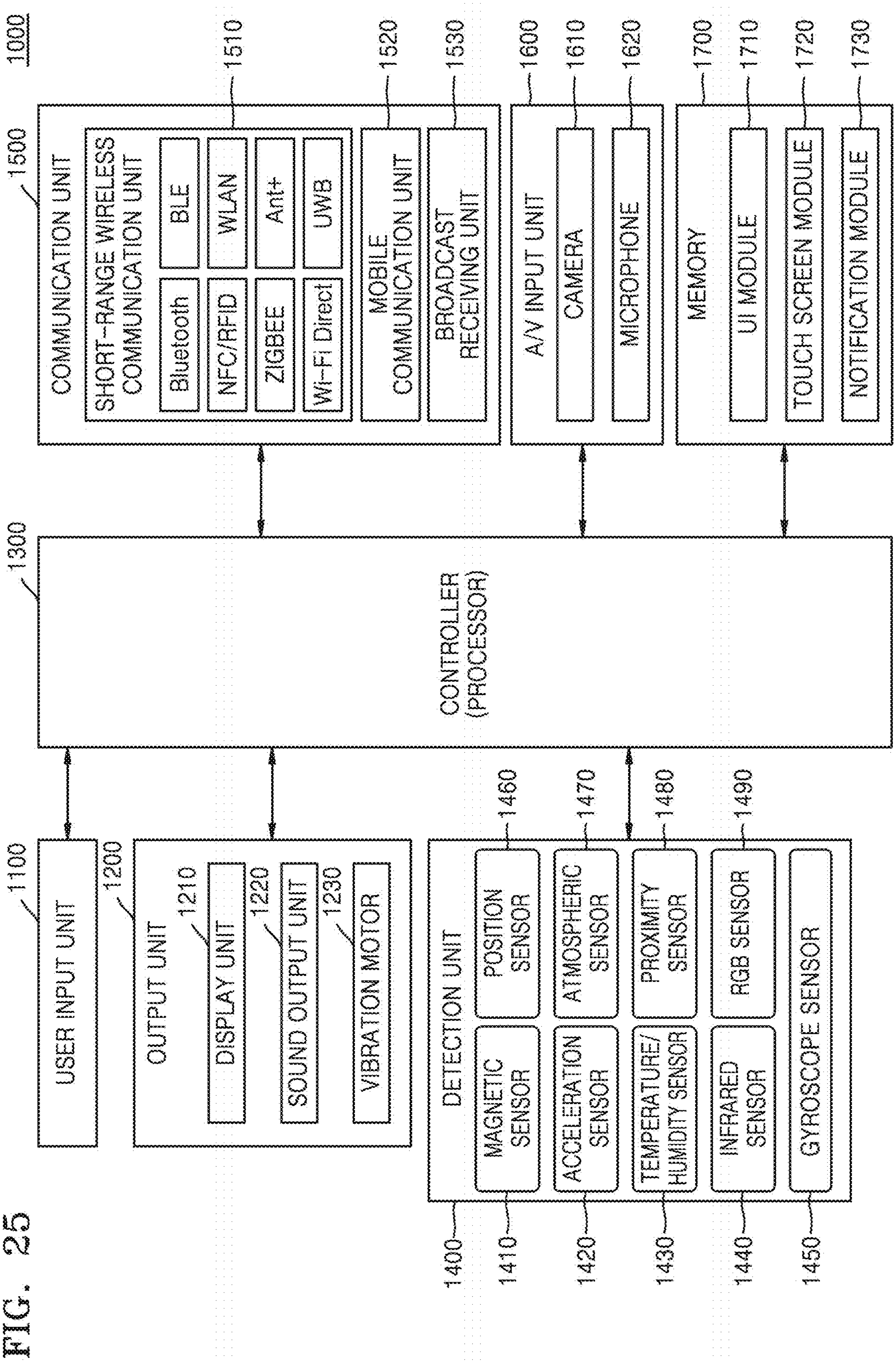

FIGS. 24 and 25 are block diagrams of a device according to various embodiments of the present disclosure.

Referring to FIG. 24, the device 1000, according to an embodiment of the present disclosure, may include a user input unit 1100, an output unit 1200, a controller 1300, and a communication unit 1500. However, not all components illustrated in FIG. 24 are essential components of the device 1000. Thus, the device 1000 may include more or less components than those shown in FIG. 24.

Referring to FIG. 25, the device 1000, according to an embodiment of the present disclosure, may further include a detection unit 1400, an audio/video (A/V) input unit 1600, and a memory 1700 in addition to the user input unit 1100, the output unit 1200, the controller 1300, and the communication unit 1500.

The user input unit 1100 is used by a user to input data for controlling the device 1000. Examples of the user input unit 1100 include a keypad, a dome switch, a touch pad (a touch capacitance type, a pressure resistance film type, an infrared light detecting type, a surface ultrasound conducting type, an integral tension measuring type, or a piezo-effect type), a jog wheel, and a jog switch, but are not limited thereto.

The output unit 1200 may output an audio signal, a video signal, or a vibration signal, and may include the display unit 1210, a sound output unit 1220, and a vibration motor 1230.

The display unit 1210 displays and outputs information processed by the device 1000. For example, the display unit 1210 may output a to-do list of the user, notification information of an unperformed task, and additional information and guide information related to the unperformed task. In addition, the display unit 1210 may display a GUI for editing the to-do list or a GUI for determining a notification time of the notification information.

Meanwhile, when the display unit 1210 is configured as a touch screen by forming a layer structure with a touch pad, the display unit 1210 may also be used as an input device as well as an output device. The display unit 1210 may include at least one of a liquid crystal display (LCD), a thin-film transistor-LCD (TFT-LCD), an organic light-emitting diode (OLED), a flexible display, a three-dimensional (3D) display, and an electrophoretic display. According to an embodiment of the present disclosure of the device 1000, the device 1000 may include at least two display units 1210. Here, the at least two display units 1210 may be disposed to face each other by using a hinge.

The sound output unit 1220 outputs audio data received from the communication unit 1500 or stored in the memory 1700. In addition, the sound output unit 1220 outputs a sound signal related to a function performed by the device 1000, such as a call signal reception sound, a message reception sound, or an alarm sound. The sound output unit 1220 may include a speaker or a buzzer.

The vibration motor 1230 may output a vibration signal. For example, the vibration motor 1230 may output a vibration signal corresponding to an output of audio data or video data, for example, a call signal reception sound or a message reception sound. In addition, the vibration motor 1230 may output a vibration signal when a touch screen is touched.

The controller 1300 generally controls an overall operation of the device 1000. For example, the controller 1300 may generally control the user input unit 1100, the output unit 1200, the detection unit 1400, the communication unit 1500, and the A/V input unit 1600 by executing programs stored in the memory 1700.

In detail, the controller 1300 may obtain behavior information of the user. The behavior information of the user may be information about behavior of the user using the device 1000, and may be used to determine an obligation of the user. For example, the controller 1300 may obtain information about telephone conversation through the device 1000, contents of messages exchanged through the device 1000, contents of emails exchanged through the device 1000, contents of memos recorded in the device 1000, contents of voice memos recorded in the device 1000, and contents of a schedule of the user stored in the device 1000. In addition, the controller 1300 may convert the telephone conversation to text, and obtain tone information of the telephone conversation.

The controller 1300 may generate a to-do list of the user. The controller 1300 may generate the to-do list of the user by analyzing the behavior information of the user. The controller 1300 may analyze communication contents between the user and another user, and determine the obligation of the user based on the analyzed communication contents. For example, the controller 1300 may analyze the communication contents between the user and the other user by using at least one of various data mining technologies. In addition, for example, the controller 1300 may analyze the communication contents between the user and the other user by using at least one of various natural language interpreting technologies. At this time, the controller 1300 may interpret meanings of the communication contents between the user and the other user through a natural language processing method, such as morpheme analysis or construction analysis.

The controller 1300 may analyze the memos and the schedule of the user recorded in the device 1000 to determine the obligation of the user. The controller 1300 may analyze the memos and the schedule by using at least one of various data mining technologies and natural language interpreting technologies.

The controller 1300 may determine the obligation of the user by analyzing an operation of the device 1000, the operation being performed through an application installed in the device 1000. Here, the controller 1300 may determine the obligation of the user by using log information about the application.

The controller 1300 may analyze the behavior information to determine a task the other user requests the user to do, a task the user requests the other user to do, and a task related to a question of the user or the other user.

The obligation of the user may include a simple task or a complex task. A simple task may include one task, such as "transmit file" or "transmit email". A complex task may include a main task and a sub task, for example, a main task, such as "prepare for trip" and sub tasks, such as "book flight ticket", "search for tourist attraction", "rent car", and "buy travel goods".

The controller 1300 may display, on the screen of the device 1000, the generated to-do list, and provide to the user an editing tool for editing the to-do list. The controller 1300 may revise and verify the to-do list based on a user input through the editing tool.

The controller 1300 may determine whether a task included in the to-do list is performed. The controller 1300 may determine whether the task included in the to-do list is performed by using log information of the user, which is stored in the device 1000, another device (not shown), and the service providing server 3000. At this time, a monitoring item related to performing of the task in the to-do list may be pre-set. For example, the monitoring item may be an item related to an application, the user, or an operation of the application or the user related to performing of the task in the to-do list. In addition, the controller 1300 may determine whether the task in the to-do list is performed by analyzing the monitoring item by using the log information.

The controller 1300 may obtain log information about an operation of the device 1000, log information about an operation of the other device 4000 of the other user, and log information of the user and the other user in the service providing server 3000 to which the user and the other user are registered. The controller 1300 may determine whether the task in the to-do list is performed based on the obtained log information. For example, when the task in the to-do list is "send photo from user A of device 1000 to other user B", the controller 1300 may monitor log information about an operation of another device (not shown) of the user B or of the user B stored in the service providing server 3000 to which the user B is registered.

A time when the device 1000 determines whether the task in the to-do list is performed may be pre-set.

The controller 1300 may determine the other user and content related to determining of whether the task in the to-do list is performed. The device 1000 may determine a meaning of the task in the to-do list and determine the other user and the content related to performing of the task. For example, when the task in the to-do list is "take and send photo of Girls Generation to user C", the device 1000 may determine that the other user related to the task is the user C and may collect user information of the user C. In addition, the device 1000 may determine that the content related to the task is a photo of Girls Generation, which is taken by the device 1000.

The controller 1300 may determine an application and a function related to determining of whether the task in the to-do list is performed. For example, when the task in the to-do list is "take and send photo of Girls Generation to user C", the controller 1300 may determine a camera application, a message exchange application, and a web browser as applications related to the task, from among applications installed in the device 1000. In addition, the controller 1300 may determine a photographing function, a location and time determining function during photographing, and a photo storing function of the camera application as functions related to the task. In addition, the controller 1300 may determine a recipient input function, a photo enclosing function, and a photo transmitting function of the message exchange application as functions related to the task.

In addition, for example, when the task in the to-do list is "book flight tickets for Jeju island", the controller 1300 may determine an application that may be used to book flight tickets from among applications installed in the device 1000. In addition, the controller 1300 may determine a function that may be used to book flight tickets from among functions of the determined application.

The controller 1300 may determine detailed operations of the device 1000 for performing the task in the to-do list and relations between the detailed operations. The controller 1300 may define the detailed operations of the device 1000 required to perform the task by combining some or all of the determined application, function, other user, and content. In addition, the controller 1300 may determine the relations between the defined detailed operations, and generate a relation graph indicating the relations between the detailed operations.

The controller 1300 may determine whether the task in the to-do list is performed. The controller 1300 may determine whether the task in the to-do list is being performed or has been performed by considering the relations between the detailed operations as some or all of the detailed operations are performed.

The controller 1300 may output notification information about an unperformed task from among the tasks included in the to-do list. The controller 1300 may pre-set a time when the notification information is output. For example, the controller 1300 may output the notification information in a pre-set cycle. For example, the controller 1300 may output the notification information when a pre-set event, such as execution of a certain application or a certain time being reached, is generated.

The controller 1300 may generate basis information indicating a reason for outputting the notification information, and output the notification information including the basis information. Here, the controller 1300 may generate the basis information in a natural language.

The controller 1300 may output additional information related to performing of the unperformed task of the user. In addition, the controller 1300 may provide, to the user, a guide for performing the unperformed task. For example, the controller 1300 may recommend the user detailed operations for performing the unperformed task, or may automatically perform some of the detailed operations.

Meanwhile, when the server 2000 generates the to-do list of the user, the controller 1300 may provide, to the server 2000, the behavior information of the user, and receive, from the server 2000, the to-do list of the user.

In addition, when the server 2000 determines whether the task in the to-do list is performed, the controller 1300 may transmit, to the server 2000, information required to determine whether the task in the to-do list is performed. The controller 1300 may receive information about the unperformed task from the server 2000.

The detection unit 1400 may detect a state of the device 1000 or a state around the device 1000, and transmit the detected state to the controller 1300.

The detection unit 1400 may include at least one of a magnetic sensor 1410, an acceleration sensor 1420, a temperature/humidity sensor 1430, an infrared sensor 1440, a gyroscope sensor 1450, a position sensor 1460, such as a global positioning system (GPS), an atmospheric sensor 1470, a proximity sensor 1480, and an red, green, blue (RGB) sensor 1490, such as an illuminance sensor, but a component included in the detection unit 1400 is not limited thereto. Because functions of each sensor may be intuitively inferred by one of ordinary skill in the art based on its name, details thereof are not described herein.

The communication unit 1500 may include at least one component enabling the device 1000 to communicate with the server 2000, the service providing server 3000, and/or the other device 4000. For example, the communication unit 1500 may include a short-range wireless communication unit 1510, a mobile communication unit 1520, and a broadcast receiving unit 1530.

The short-range wireless communication unit 1510 may include a Bluetooth communication unit, a Bluetooth low energy (BLE) communication unit, a near field communication (NFC) unit, a wireless local area network (WLAN) (Wi-Fi) communication unit, a ZigBee communication unit, an infrared data association (IrDA) communication unit, a Wi-Fi direct (WFD) communication unit, an ultra-wide band (UWB) communication unit, and an Ant+ communication unit, but components included in the short-range wireless communication unit 141 are not limited thereto.

The mobile communication unit 1520 transmits and receives a wireless signal to and from at least one of a base station, an external terminal, and a server, on a mobile communication network. Here, a wireless signal may include data having various formats according to transmission and reception of a voice call signal, a video telephone call signal, or a text/multimedia message.

The broadcast receiving unit 1530 receives a broadcast signal and/or broadcast related information from an external source, through a broadcast channel. The broadcast channel may include a satellite channel or a terrestrial broadcasting channel. In various embodiments of the present disclosure, the device 1000 may not include the broadcast receiving unit 1530.

In addition, the communication unit 1500 may exchange, with the server 2000, the service providing server 3000, and the other device 4000, information required to generate the to-do list of the user, determine the unperformed task, and notify the unperformed task.

The A/V input unit 1600 is used to receive an audio signal or a video signal, and may include a camera 1610 and a microphone 1620. The camera 1610 may obtain an image frame of a still image or a moving image via an image sensor in a video telephone mode or a photographing mode. An image captured via the image sensor may be processed by the controller 1300 or a separate image processor (not shown).

An image frame processed by the camera 1610 may be stored in the memory 1700 or transmitted to an external device through the communication unit 1500. According to an embodiment of the device 1000, the device 1000 may include at least two cameras 1610.

The microphone 1620 receives an external sound signal and processes the external sound signal to electric voice data. For example, the microphone 1620 may receive a sound signal from an external device or a narrator. The microphone 1620 may use any one of various noise removing algorithms to remove noise generated while receiving the external sound signal.

The memory 1700 may store a program for processes and control of the controller 1300, and may store data input to the device 1000 or output from the device 1000.

The memory 1700 may include at least storage medium from among a flash memory, a hard disk, a multimedia card micro type memory, a card type memory (for example, a secure digital (SD) card, an extreme digital (XD) card, and the like), a random access memory (RAM), a static RAM (SRAM), a read-only memory (ROM), an electrically erasable programmable ROM (EEPROM), a programmable ROM (PROM), a magnetic memory, a magnetic disk, and an optical disk.

Programs stored in the memory 1700 may be classified into a plurality of modules based on functions, and may be classified into a UI module 1710, a touch screen module 1720, and a notification module 1730.

The UI module 1710 may provide a specialized UI or GUI linked to the device 1000 according to applications. The touch screen module 1720 may detect a touch gesture of a user on a touch screen, and transmit information about the touch gesture to the controller 1300. The touch screen module 1720, according to an embodiment of the present disclosure, may recognize and analyze a touch code. The touch screen module 1720 may be configured as separate hardware including a controller.

Various sensors may be disposed inside or around the touch screen to detect a touch or a proximity touch on the touch screen. An example of a sensor for detecting a touch on the touch screen includes a tactile sensor. The tactile sensor detects a contact that can be felt by a person on a certain object. The tactile sensor may detect various types of information, such as a roughness of a contact surface, a rigidness of a contact object, and a temperature of a touch point.

Another example of a sensor for detecting a touch on the touch screen includes a proximity sensor.

The proximity sensor detects an existence of an object approaching or near a certain detection surface by using electromagnetic field force or infrared ray, without having to detect a mechanical contact. Examples of the proximity sensor include a transmission photoelectric sensor, a direct reflective type photoelectric sensor, a mirror reflective type photoelectric sensor, a high frequency oscillation proximity sensor, a capacitance type proximity sensor, a magnetic type proximity sensor, and an infrared proximity sensor. Examples of a touch gesture of a user include tap, touch and hold, double-tap, drag, panning, flick, drag-and-drop, and swipe.

The notification module 1730 may generate a signal for notifying an event occurrence in the device 1000. Examples of an event that occurs in the device 1000 include call signal reception, a message reception, key signal input, and schedule notification. The notification module 1730 may output a notification signal in a video signal format through the display unit 1210, in an audio signal format through the sound output unit 1220, or in a vibration signal format through the vibration motor 1230.

Figure 26:
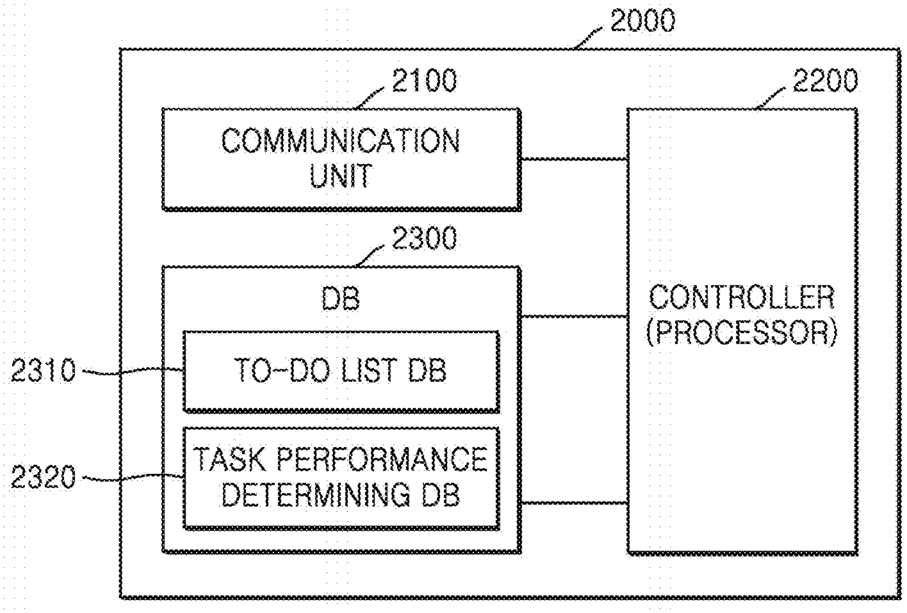
FIG. 26 is a block diagram of a server according to an embodiment of the present disclosure.

FIG. 26 is a block diagram of a server according to an embodiment of the present disclosure.

Referring to FIG. 26, the server 2000, according to an embodiment of the present disclosure, may include a communication unit 2100, a controller 2200, and a database (DB) 2300. In addition, the DB 2300 may include a to-do list DB 2310 and a task performance determining DB 2320.

When the device 1000 generates a to-do list of a user and determines whether a task in the to-do list is performed, the server 2000 may provide, to the device 1000, information required to generate the to-do list and determine whether the task in the to-do list is performed.

In addition, when the server 2000 generates the to-do list of the user and determines whether the task in the to-do list is performed, the server 2000 may receive, from the device 1000, the other device 4000, and the service providing server 3000, information required to generate the to-do list and determine whether the task in the to-do list is performed.

The communication unit 2100 may include at least one component enabling the server 2000 to communicate with the device 1000, the service providing server 3000, and/or the other device 4000. For example, the communication unit 2100 may include a short-range wireless communication unit, a wireless communication unit, and a wired communication unit.

The controller 2200 may control the communication unit 2100 and the DB 2300 to generate the to-do list of the user and determine whether the task in the to-do list is performed.

The controller 2220 may obtain behavior information of the user. The controller 2200 may receive behavior information of the user, which is obtained by the device 1000, from the device 1000, behavior information of the user and another user, which is obtained by the service providing server 3000, from the service providing server 3000, and behavior information of the other user, which is obtained by the other device 4000, from the other device 4000. In addition, the controller 2200 may obtain behavior information of the user using a service of the server 2000.

The controller 2200 may generate the to-do list of the user by analyzing the behavior information of the user and/or the other user. The controller 2200 may identify the other user related to behavior of the user based on the behavior information of the user, and analyze the behavior information of the identified other user and the behavior information of the user to generate the to-do list of the user.

The controller 2200 may analyze communication contents between the user and the other user, and determine an obligation of the user based on the analyzed communication contents. For example, the controller 2200 may analyze the communication contents between the user and the other user by using at least one of various data mining technologies. In addition, for example, the controller 2200 may analyze the communication contents between the user and the other user by using at least one of various natural language interpreting technologies. At this time, the controller 2200 may interpret meanings of the communication contents between the user and the other user through a natural language processing method, such as morpheme analysis or construction analysis.

In addition, the controller 2200 may analyze memos and schedules of the user recorded in the device 1000, the other device 4000, and/or the service providing server 3000 to determine the obligation of the user. The controller 2200 may analyze the memos and the schedules of the user by using at least one of various data mining technologies and natural language interpreting technologies.

In addition, the controller 2200 may determine the obligation of the user by analyzing operations of the device 1000 and/or the other device 4000, which are performed through applications installed in the device 1000 and/or the other device 4000. In this case, the controller 2200 may determine the obligation of the user by using log information about the applications.

The obligation of the user may be a simple task or a complex task. A simple task may include one task, such as "transmit file" or "transmit email". A complex task may include a main task, such as a main task "prepare for trip" and sub tasks, such as "book flight ticket", "search for tourist attraction", "rent car", and "buy travel goods".

In addition, the controller 2200 may verify authenticity of the to-do list of the user by comparing the behavior information obtained from the device 1000, the behavior information obtained from the other device 4000, and the behavior information obtained from the service providing server 3000.

The controller 2200 may provide the to-do list of the user to the device 1000. The controller 2200 may provide the to-do list of the user to the device 1000 in response to a request from the device 1000. The controller 2200 may provide, to the device 1000, the to-do list of the user in a pre-set cycle. The controller 2200 may provide, to the device 1000, the to-do list of the user, when a pre-set event is generated. Here, the pre-set event may include generation or update of the to-do list, but is not limited thereto. In addition, the controller 2200 may store a generated, revised, or updated to-to list in the to-do list DB 2310.

The controller 2200 may receive, from the device 1000, information related to a function of an application executed in the device 1000. The device 1000 may determine the other user and content related to determining of the task in the to-do list. In addition, the device 1000 may identify an application and a function of the application related to the to-do list of the user and provide to the server 2000 information about whether the identified function is performed.

The controller 2200 may receive service use information of the user and the other user from the service providing server 3000. Here, the controller 2200 may request the service providing server 3000 for the service use information of the user and the other user by providing service ID of the user and service ID of the other user related to the to-do list of the user to the service providing server 3000.

The controller 2200 may receive, from the other device 4000, information about a function of an application executed in the other device 4000. In this case, the controller 2200 may request the other device 4000 for the information about the function of the application executed in the other device 4000 by identifying the task related to the other user from among the tasks in the to-do list of the user and providing, to the other device 4000, an application and a function of the application related to performing of the identified task.

The controller 2200 may determine whether the task in the to-do list of the user is performed. The controller 2200 may determine detailed operations of the device 1000, the other device 4000, and the service providing server 3000 for performing the task in the to-do list, and relations between the detailed operations, and determine whether the task is performed while considering the determined relations.

The controller 2200 may update the to-do list based on an unperformed task in the to-do list. The controller 2200 may delete a performed task from the to-do list, and when a detailed task related to the performed task exists, the controller 2200 may add the detailed task to the to-do list.

The controller 2200 may generate additional information about performing of the unperformed task of the user. In addition, the controller 2200 may generate guide information for performing the unperformed task. For example, the controller 2200 may recommend the user detailed operations for the device 1000 to perform the unperformed task or generate additional information and/or guide information for some of the detailed operations to be automatically performed.

The controller 2200 may provide a list of unperformed tasks to the device 1000. The controller 2200 may provide notification information including a reason for notifying the device 1000 about the unperformed task. The controller 2200 may provide the additional information and/or the guide information to the device 1000.

The to-do list DB 2310 may store the generated, revised, and/or updated to-do list. In addition, the to-do list DB 2310 may store a time when the to-do list is provided.

The task performance determining DB 2320 may store information about a reason for determining whether the task in the to-do list is performed. The task performance determining DB 2320 may store information about detailed operations of the device 1000, detailed operations of the other device 4000, detailed operations of the service providing server 3000, and relations between the detailed operations for performing the task in the to-do list. In addition, the task performance determining DB 2320 may store a relation graph indicating the relations between the detailed operations. In addition, the task performance determining DB 2320 may store information about a time when information about the unperformed task in the to-do list is notified and about a time of determining whether the task in the to-do list is performed.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

In addition, herein, a "unit" may be a hardware component, such as a processor or a circuit, and/or a software component executed by a hardware component, such as a processor.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A device for providing a task, the device comprising:
- a display;
- a communication circuit;
- memory storing one or more computer programs; and
- one or more processors communicatively coupled to the display, the communication circuit, and the memory,
- wherein the one or more computer programs include instructions which, when executed by the one or more processors individually or collectively, cause the device to:
  - record a telephone conversation while a user of the device is on a call,
  - transmit, to a server through the communication circuit, the telephone conversation,
  - based on the transmitting of the telephone conversation to the server, receive, from the server through the communication circuit, a task agreed upon between the user of the device and a call participant, wherein the task includes a date when the task is to be performed, wherein the task and the date are inferenced from the telephone conversation by applying a converted telephone conversation to a natural language processing model,
  - based on the receiving of the task from the server, display, through the display, a user interface for verifying the task, wherein the user interface includes the task and the date when the task is to be performed, and
  - based on a user input received via the user interface, determine the task as a to-do item.

2. The device of claim 1, wherein the one or more computer programs further include instructions which, when executed by the one or more processors individually or collectively, cause the device to:
- receive a sub task as a detailed operation for performing the task from the server, wherein the sub task is inferenced based on the telephone conversation and the task, and
- display the sub task as the detailed operation for performing the task.

3. The device of claim 2, wherein the one or more computer programs further include instructions which, when executed by the one or more processors individually or collectively, cause the device to:
- display an application for performing the sub task, and
- based on a user input regarding the application, perform the sub task by executing the application.

4. The device of claim 1,
- wherein, based on a context of the telephone conversation, an authentic level of the task is determined, and
- wherein, when the authentic level of the task is equal to or higher than a pre-set threshold value, the task is transmitted from the server to the device.

5. The device of claim 1, wherein the one or more computer programs further include instructions which, when executed by the one or more processors individually or collectively, cause the device to:
- receive a user input of revising the task on the user interface for verifying the task, and
- determine the revised task as the to-do item.

6. The device of claim 1, wherein the one or more computer programs further include instructions which, when executed by the one or more processors individually or collectively, cause the device to:
- in response to receiving a call signal, display summarized information on recent telephone conversation between the user and a caller on a user interface for an incoming call.

7. A method performed by a device, the method comprising:
- recording, by the device, a telephone conversation while a user of the device is on a telephone call;
- transmitting, by the device to a server, the telephone conversation;
- based on the transmitting of the telephone conversation to the server, receiving, by the device from the server, a task agreed upon between the user of the device and a call participant, wherein the task includes a date when the task is to be performed, wherein the task and the date are inferenced from the telephone conversation by applying a converted telephone conversation to a natural language processing model;
- based on the receiving of the task from the server, displaying, by the device, a user interface for verifying the task, wherein the user interface includes the task and the date when the task is to be performed; and
- based on a user input received via the user interface, determining, by the device, the task as a to-do item.

8. The method of claim 7, further comprising:
- receiving, by the device, a sub task as a detailed operation for performing the task from the server, wherein the sub task is inferenced based on the telephone conversation and the task; and
- displaying, by the device, the sub task as the detailed operation for performing the task.

9. The method of claim 8, further comprising:
- displaying, by the device, an application for performing the sub task; and
- based on a user input regarding the application, performing, by the device, the sub task by executing the application.

10. The method of claim 7, wherein, when an authentic level of the task is equal to or higher than a pre-set threshold value, the task is transmitted from the server to the device.

11. The method of claim 7, further comprising:
- receiving, by the device, a user input of revising the task on the user interface for verifying the task; and
- determining, by the device, the revised task as the to-do item.

12. The method of claim 7, further comprising:
- in response to receiving a call signal, displaying, by the device, summarized information on a recent telephone conversation between the user and a caller on a user interface for an incoming call.

* * * * *